United States Patent
Price et al.

(10) Patent No.: US 11,651,506 B2
(45) Date of Patent: May 16, 2023

(54) SYSTEMS AND METHODS FOR LOW COMPUTE HIGH-RESOLUTION DEPTH MAP GENERATION USING LOW-RESOLUTION CAMERAS

(71) Applicant: MICROSOFT TECHNOLOGY LICENSING, LLC, Redmond, WA (US)

(72) Inventors: Raymond Kirk Price, Redmond, WA (US); Michael Bleyer, Seattle, WA (US); Christopher Douglas Edmonds, Carnation, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 79 days.

(21) Appl. No.: 17/235,159

(22) Filed: Apr. 20, 2021

(65) Prior Publication Data

US 2022/0335637 A1    Oct. 20, 2022

(51) Int. Cl.
*G06T 5/00* (2006.01)
*G06T 7/593* (2017.01)
(Continued)

(52) U.S. Cl.
CPC ........... *G06T 7/593* (2017.01); *G02B 27/017* (2013.01); *G06T 3/40* (2013.01); *G06T 5/20* (2013.01);
(Continued)

(58) Field of Classification Search
CPC . G06T 2207/10024; G06T 2207/10028; G06T 7/593; G06T 5/001; G06T 7/174
See application file for complete search history.

(56) References Cited

U.S. PATENT DOCUMENTS

2018/0302564 A1\* 10/2018 Liu .................. H04N 13/25
2021/0241495 A1\* 8/2021 Cappello ................. G06T 7/90
(Continued)

OTHER PUBLICATIONS

Combier, et al., "Towards an Augmented Reality Head Mounted Display System Providing Stereoscopic Wide Field of View for Indoor and Outdoor Environments with Interaction through the Gaze Direction", In Proceedings of 13th International Conference on Computer Vision Theory and Applications (VISIGRAPP), vol. 4, Jan. 27, 2018, pp. 17-27.

(Continued)

*Primary Examiner* — Li Liu
(74) *Attorney, Agent, or Firm* — Workman Nydegger

(57) ABSTRACT

A system for low compute high-resolution depth map generation using low-resolution cameras is configured to obtain a stereo pair of images and generate a depth map by performing stereo matching on the stereo pair of images. The system is also configured to obtain a first image comprising first texture information for the environment that has a first image resolution that is higher than an image resolution of images of the stereo pair of images. The system is further configured to generate a reprojected first image by reprojecting the first image to correspond to an image capture perspective associated with the depth map. The reprojection of the first image is based on depth information from the depth map and includes reprojected first texture information for the environment. The system is also configured to generate an upsampled depth map based on the depth map.

15 Claims, 19 Drawing Sheets

(51) Int. Cl.
    *G02B 27/01* (2006.01)
    *G06T 3/40* (2006.01)
    *G06T 5/20* (2006.01)
    *G06T 5/50* (2006.01)
(52) U.S. Cl.
    CPC ...... *G06T 5/50* (2013.01); *G06T 2207/10012* (2013.01); *G06T 2207/10048* (2013.01); *G06T 2207/20028* (2013.01)

(56) References Cited

U.S. PATENT DOCUMENTS

2021/0358158 A1* 11/2021 Peri .......................... G06T 7/73
2022/0014723 A1* 1/2022 Pandey ................ G06V 10/462

OTHER PUBLICATIONS

Yang, et al., "Spatial-Depth Super Resolution For Range Images", In Proceedings of the IEEE Conference on Computer Vision and Pattern Recognition, Jun. 17, 2007, 8 Pages.

Zhao, et al., "Registration of Depth Image and Color Image Based on Harris-SIFT", In Proceedings of the IEEE, Apr. 6, 2012, 5 Pages.

"Invitation To Pay Additional Fees Issued in PCT Application No. PCT/US2022/024977", dated Jul. 29, 2022, 14 Pages.

"International Search Report and Written Opinion Issued in PCT Application No. PCT/US2022/024977", dated Sep. 19, 2022, 15 Pages.

* cited by examiner

SYSTEMS AND METHODS FOR LOW COMPUTE HIGH-RESOLUTION DEPTH MAP GENERATION USING LOW-RESOLUTION CAMERAS

BACKGROUND

Mixed-reality (MR) systems, including virtual-reality and augmented-reality systems, have received significant attention because of their ability to create truly unique experiences for their users. For reference, conventional virtual-reality (VR) systems create a completely immersive experience by restricting their users' views to only a virtual environment. This is often achieved, in VR systems, through the use of a head-mounted device (HMD) that completely blocks any view of the real world. As a result, a user is entirely immersed within the virtual environment. In contrast, conventional augmented-reality (AR) systems create an augmented-reality experience by visually presenting virtual objects that are placed in or that interact with the real world.

As used herein, VR and AR systems are described and referenced interchangeably. Unless stated otherwise, the descriptions herein apply equally to all types of mixed-reality systems, which (as detailed above) includes AR systems, VR reality systems, and/or any other similar system capable of displaying virtual objects.

Many mixed-reality systems include a depth reconstruction system (e.g., time of flight camera, rangefinder, stereoscopic depth cameras, etc.). A depth reconstruction system provides depth information about the real-world environment surrounding the mixed-reality system to enable the system to accurately present mixed-reality content (e.g., holograms) with respect to real-world objects. As an illustrative example, a depth reconstruction system is able to obtain depth information for a real-world table positioned within a real-world environment. The mixed-reality system is then able to render and display a virtual figurine accurately positioned on the real-world table such that the user perceives the virtual figurine as though it were part of the user's real-world environment.

Some mixed-reality systems employ stereo cameras for depth detection or for other purposes, besides depth detection. For example, a mixed-reality system may utilize images obtained by stereo cameras to provide a pass-through view of the user's environment to the user. A pass-through view can aid users in avoiding disorientation and/or safety hazards when transitioning into and/or navigating within an immersive mixed-reality environment.

Some mixed-reality systems are also configured with cameras of different modalities to enhance users' views in low visibility environments. For example, mixed-reality systems configured with long wavelength thermal imaging cameras facilitate visibility in smoke, haze, fog, and/or dust. Likewise, mixed-reality systems configured with low light imaging cameras facilitate visibility in dark environments where the ambient light level is below the level required for human vision. In some instances, low light and thermal images may be fused or combined to provide users with visualizations from multiple camera modalities simultaneously.

A mixed-reality system can present views captured by stereo cameras to users in a variety of ways. The process of using images captured by world-facing cameras to provide three-dimensional views of a real-world environment to a user creates many challenges.

Initially, the physical positioning of the stereo cameras is physically separated from the physical positioning of the user's eyes. Thus, directly providing the images captured by the stereo cameras to the user's eyes would cause the user to perceive the real-world environment incorrectly. For example, a vertical offset between the positioning of the user's eyes and the positioning of the stereo cameras can cause the user to perceive real-world objects as vertically offset from their true position with respect to the user. In another example, a difference in the spacing between the user's eyes and the spacing between the stereo cameras can cause the user to perceive real-world objects with incorrect depth.

The difference in perception between how the cameras observe an object and how a user's eyes observe an object is often referred to as the "parallax problem" or "parallax error." FIG. 1 illustrates a conceptual representation of the parallax problem in which a stereo pair of cameras 105A and 105B is physically separated from a user's eyes 110A and 110B. Sensor region 115A conceptually depicts the image sensing regions of camera 105A (e.g., the pixel grid) and the user's eye 110A (e.g., the retina). Similarly, sensor region 115B conceptually depicts the image sensing regions of camera 105B and the user's eye 110B.

The cameras 105A and 105B and the user's eyes 110A and 110B perceive an object 130, as indicated in FIG. 1 by the lines extending from the object 130 to the cameras 105A and 105B and the user's eyes 110A and 110B, respectively. FIG. 1 illustrates that the cameras 105A and 105B perceive the object 130 at different positions on their respective sensor regions 115A, 115B. Similarly, FIG. 1 shows that the user's eyes 110A and 110B perceive the object 130 at different positions on their respective sensor regions 115A, 115B. Furthermore, the user's eyes 110A perceives the object 130 at a different position on sensor region 115A than camera 105A, and the user's eye 110B perceives the object 130 at a different position on sensor region 115B than camera 105B.

Some approaches for correcting for the parallax problem involve performing a camera reprojection from the perspective of the stereo cameras to the perspective of the user's eyes. For instance, some approaches involve performing a calibration step to determine the differences in physical positioning between the stereo cameras and the user's eyes. Then, after capturing a stereo pair of images with the stereo cameras, a step of calculating depth information (e.g., a depth map) based on the stereo pair of images is performed (e.g., by performing stereo matching). Subsequently, a system can reproject the calculated depth information to correspond to the perspective of the user's left eye and right eye.

However, calculating depth information (e.g., depth maps) based on a stereo pair of images (e.g., for addressing the parallax problem) is associated with many challenges. For example, as noted above, a stereo pair of images of typically captured using stereo cameras. To provide an improved user experience, stereo images for generating pass-through images are often captured using high-resolution stereo cameras. High-resolution stereo cameras are costly and add to device bulk, weight, and battery consumption. Furthermore, a mixed-reality system that provides pass-through imaging for multiple camera modalities (e.g., both low light and thermal) typically requires high-resolution cameras for each different camera modality, further increasing device cost, bulk, battery consumption, and weight. Additionally, calculating depth information using a high-resolution stereo pair of images is computationally costly, which can cause latency in pass-through experiences provided.

For at least the foregoing reasons, there is an ongoing need and desire for improved techniques and systems for high-resolution depth map generation using low-resolution cameras.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments include systems and methods for low compute high-resolution depth map generation using low-resolution cameras.

Some disclosed systems are configured to obtain a stereo pair of images of an environment and generate a depth map of the environment by performing stereo matching on the stereo pair of images. The depth map includes depth information for the environment. These systems are further configured to obtain a first image comprising first texture information for the environment. The first image has a first image resolution that is higher than an image resolution of images of the stereo pair of images. These systems are also configured to generate a reprojected first image by reprojecting the first image to correspond to an image capture perspective associated with the depth map. The reprojection of the first image is based on the depth information from the depth map, and the reprojected first image includes reprojected first texture information for the environment. These systems are also configured to generate an upsampled depth map based on the depth map and the reprojected first texture information.

Some disclosed systems are configured to obtain a first image of an environment and obtain a second image of the environment. The second image captures the environment in temporal synchronization with the first image. The second image has a higher image resolution than the first image. Such systems are also configured to generate an upsampled first image. The upsampled first image has a same image resolution as the second image. The system is also configured to generate a depth map of the environment by performing stereo matching on the upsampled first image and the second image.

Some embodiments include systems that are configured to obtain a first image of an environment and obtain a second image that includes texture information for the environment. The second image captures the environment in temporal synchronization with the first image. The second image has a higher image resolution than the first image. These systems are also configured to generate a downsampled second image that has a same image resolution as the first image, and to also generate a depth map of the environment by performing stereo matching on the downsampled second image and the first image, as well as to generate an upsampled depth map based on the depth map and the texture information of the second image.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
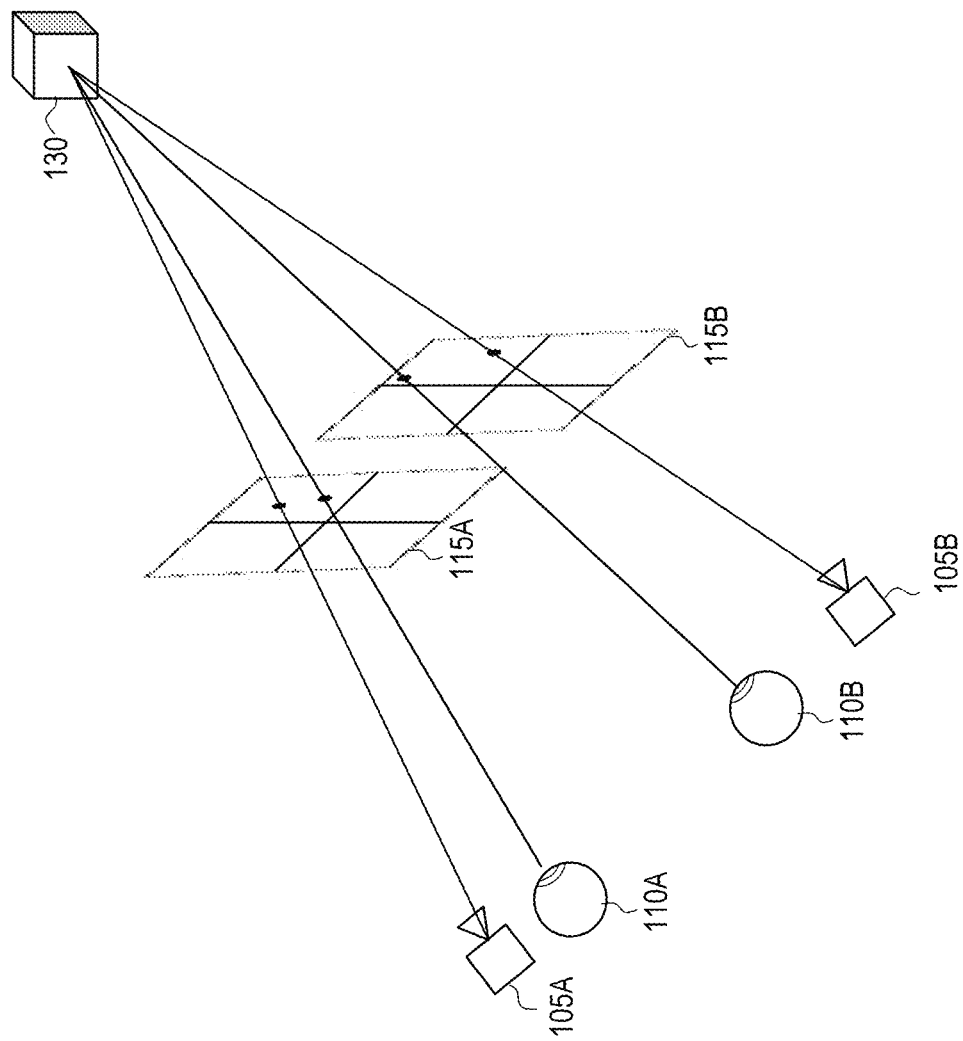
FIG. 1 illustrates an example of the parallax problem that occurs when cameras have a different perspective than a user's eyes.

Disclosed embodiments include systems and methods for facilitating low compute generation of high-resolution depth maps using low-resolution images.

Examples of Technical Benefits, Improvements, and Practical Applications

Those skilled in the art will recognize, in view of the present disclosure, that at least some of the disclosed embodiments may address various shortcomings associated with conventional approaches, devices, and/or techniques for calculating depth information (e.g., depth maps). The following section outlines some example improvements and/or practical applications provided by the disclosed embodiments. It will be appreciated, however, that the following are examples only and that the embodiments described herein are in no way limited to the example improvements discussed herein.

As described herein, a high-resolution parallax-corrected image may be generated by generating a low-resolution depth map by performing depth calculations on the stereo pair of low-resolution images, generating a high-resolution depth map by upsampling the low-resolution depth map, and reprojecting a high-resolution image to correspond to a perspective associated with the high-resolution depth map. In this regard, an HMD may implement a low-resolution stereo camera pair for capturing low-resolution images (for generating low-resolution depth maps) and may implement a single high-resolution camera for capturing high-resolution texture information for generating parallax-corrected images (or may implement a single a high-resolution camera for each desired camera modality (e.g., thermal, low light, etc.) while omitting a stereo camera pair for each desired camera modality).

Disclosed HMDs of the present disclosure utilize stereo pairs of high-resolution cameras for capturing depth information to generate parallax-corrected images. Because low-resolution cameras typically are less expensive, are smaller, are lighter in weight, and require less power than their counterpart high-resolution cameras, implementations of the present disclosure may reduce cost, bulk, weight, and/or power consumption of devices that capture images to generate parallax-corrected views of captured environments. Furthermore, performing depth calculations on low-resolution images is often more computationally efficient than performing depth calculations on high resolution images, allowing the reprojection algorithms to run at higher frame rates while dissipating less computation power.

One will appreciate, in view of the present disclosure, that at least some principles described herein may enhance applications that depend on accurate depth maps, such as performing parallax error correction to provide parallax-corrected images (e.g., pass-through images). Although the present disclosure focuses, in some respects, on depth map generation for performing parallax error correction, it should be noted that at least some of the principles described herein are applicable to other implementations that involve generating a depth map and/or rely on depth map generation. By way of non-limiting example, at least some of the principles disclosed herein may be employed in hand tracking (or tracking other real-world objects), stereoscopic video streaming, building surface reconstruction meshes, and/or other applications.

Having just described some of the various high-level features and benefits of the disclosed embodiments, attention will now be directed to FIGS. 2 through 17. These Figures provide various conceptual representations, systems, architectures, methods, and supporting illustrations related to the disclosed embodiments.

Example Systems

Figure 2:
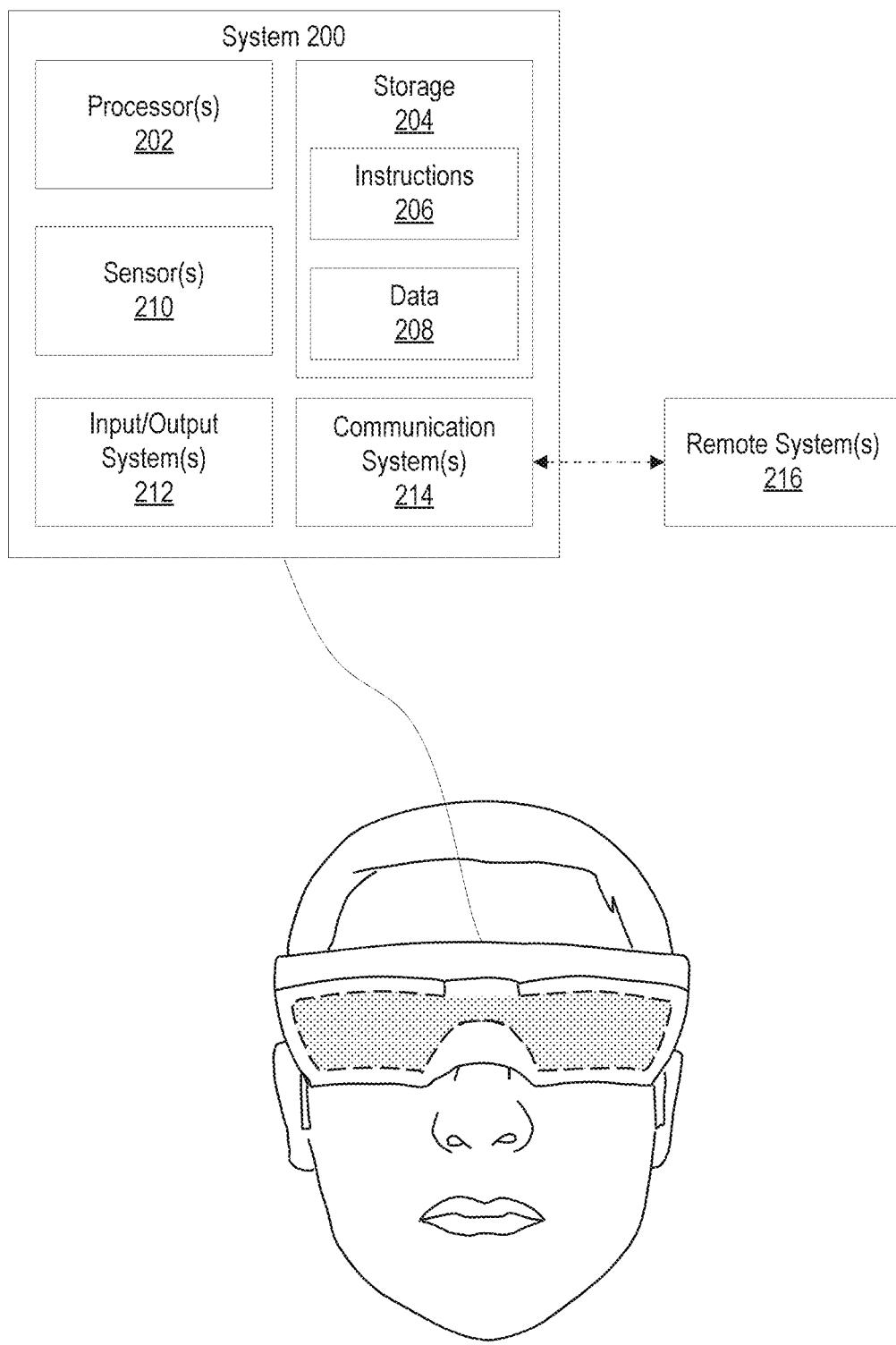
FIG. 2 illustrates an example system that may include or be used to implement disclosed embodiments.

Attention is now directed to FIG. 2, which illustrates an example system 200 that may include or be used to implement one or more disclosed embodiments. FIG. 2 depicts the system 200 as a head-mounted display (HMD) configured for placement over a head of a user to display virtual content for viewing by the user's eyes. Such an HMD may comprise an augmented reality (AR) system, a virtual reality (VR) system, and/or any other type of HMD. Although the present disclosure focuses, in at least some respects, on a system 200 implemented as an HMD, it should be noted that at the principles described herein may be implemented using other types of systems.

FIG. 2 illustrates various example components of the system 200. For example, FIG. 2 illustrates an implementation in which the system includes processor(s) 202, storage 204, sensor(s) 210, I/O system(s) 212, and communication system(s) 214. Although FIG. 2 illustrates a system 200 as including particular components, one will appreciate, in view of the present disclosure, that a system 200 may comprise any number of additional or alternative components.

The processor(s) 202 may comprise one or more sets of electronic circuitry that include any number of logic units, registers, and/or control units to facilitate the execution of computer-readable instructions (e.g., instructions that form a computer program). Such computer-readable instructions may be stored within storage 204. The storage 204 may comprise physical system memory and may be volatile, non-volatile, or some combination thereof. Furthermore, storage 204 may comprise local storage, remote storage (e.g., accessible via communication system(s) 214 or otherwise), or some combination thereof. Additional details related to processors (e.g., processor(s) 202) and computer storage media (e.g., storage 204) will be provided hereinafter.

In some implementations, the processor(s) 202 may comprise or be configurable to execute any combination of software and/or hardware components that are operable to facilitate processing using machine learning models or other artificial intelligence-based structures/architectures. For example, processor(s) 202 may comprise and/or utilize hardware components or computer-executable instructions operable to carry out function blocks and/or processing layers configured in the form of, by way of non-limiting example, single-layer neural networks, feed forward neural networks, radial basis function networks, deep feed-forward networks, recurrent neural networks, long-short term memory (LSTM) networks, gated recurrent units, autoencoder neural networks, variational autoencoders, denoising autoencoders, sparse autoencoders, Markov chains, Hopfield neural networks, Boltzmann machine networks, restricted Boltzmann machine networks, deep belief networks, deep convolutional networks (or convolutional neural networks), deconvolutional neural networks, deep convolutional inverse graphics networks, generative adversarial networks, liquid state machines, extreme learning machines, echo state networks, deep residual networks, Kohonen networks, support vector machines, neural Turing machines, and/or others.

As will be described in more detail, the processor(s) 202 may be configured to execute instructions 206 stored within storage 204 to perform certain actions associated with generating a high-resolution depth map using low-resolution images from low-resolution cameras. The actions may rely at least in part on data 208 stored on storage 204 in a volatile or non-volatile manner.

In some instances, the actions may rely at least in part on communication system(s) 214 for receiving data from remote system(s) 216, which may include, for example, separate systems or computing devices, sensors, and/or others. The communications system(s) 214 may comprise any combination of software or hardware components that are operable to facilitate communication between on-system components/devices and/or with off-system components/devices. For example, the communications system(s) 214 may comprise ports, buses, or other physical connection apparatuses for communicating with other devices/components. Additionally, or alternatively, the communications system(s) 214 may comprise systems/components operable to communicate wirelessly with external systems and/or devices through any suitable communication channel(s), such as, by way of non-limiting example, Bluetooth, ultra-wideband, WLAN, infrared communication, and/or others.

FIG. 2 illustrates that a system 200 may comprise or be in communication with sensor(s) 210. Sensor(s) 210 may comprise any device for capturing or measuring data representative of perceivable phenomenon. By way of non-limiting example, the sensor(s) 210 may comprise one or more image sensors, microphones, thermometers, barometers, magnetometers, accelerometers, gyroscopes, tracking systems (e.g., GPS) and/or others.

Furthermore, FIG. 2 illustrates that a system 200 may comprise or be in communication with I/O system(s) 212. I/O system(s) 212 may include any type of input or output device such as, by way of non-limiting example, a touch screen, a mouse, a keyboard, a controller, and/or others, without limitation. For example, the I/O system(s) 212 may include a display system that may comprise any number of display panels, optics, laser scanning display assemblies, and/or other components.

Figure 3:
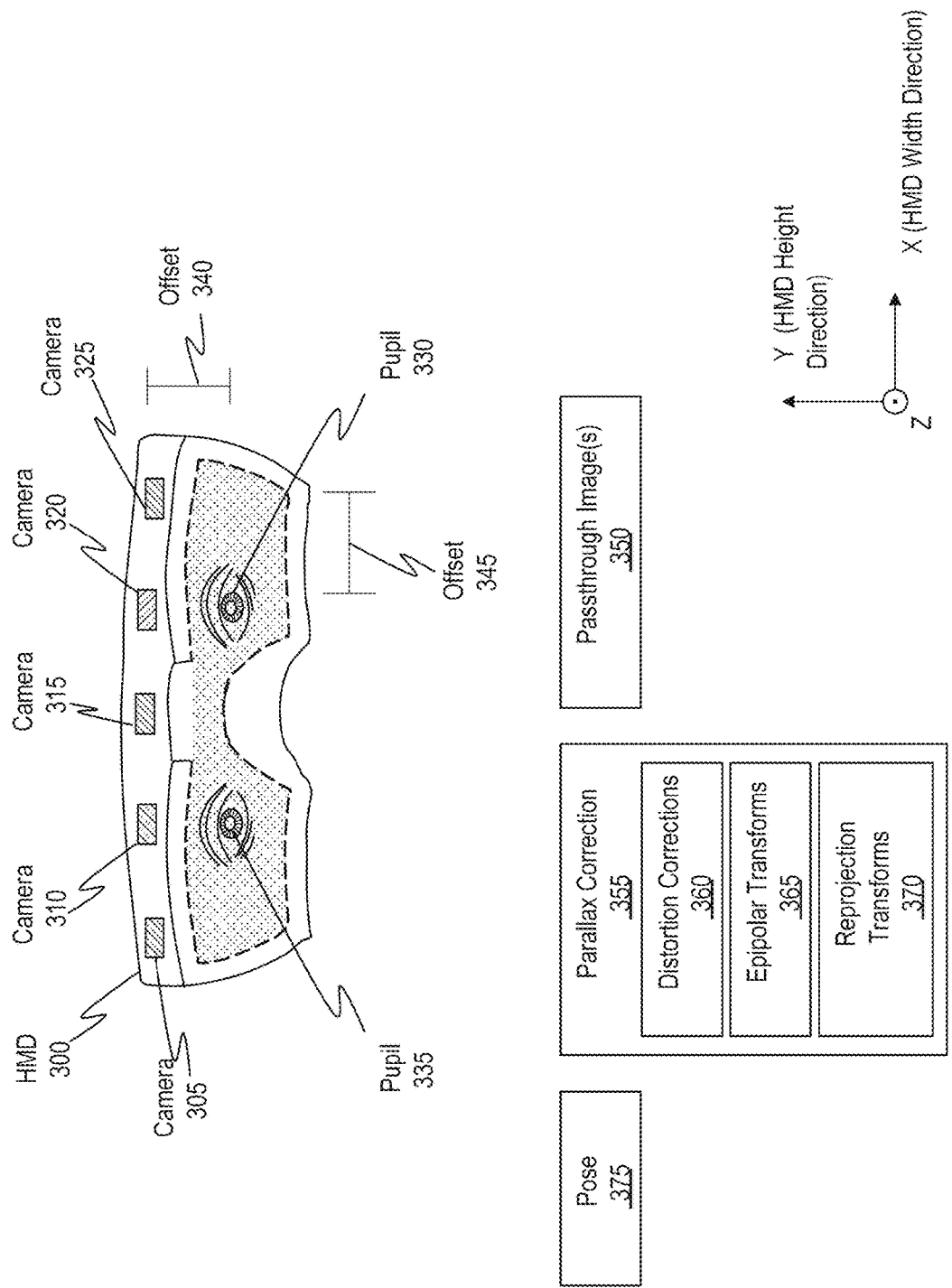
FIG. 3 illustrates example structural configurations of components of an example mixed-reality system, as well as an example of a parallax correction operation.

FIG. 3 illustrates an example HMD 300, which is an example implementation of the system 200 from FIG. 2. HMD 300 is shown as including multiple different cameras (e.g., implementations of sensor(s) 210), including cameras 305, 310, 315, 320, and 325. Cameras 305-325 may comprise any type of camera modality, such as visible light camera(s), the low light camera(s) (e.g., configured with large pixels for image sensing in environments with little ambient light, such as starlight conditions (e.g., about 10 lux or below)), the thermal imaging camera(s) (e.g., long wave infrared cameras for detecting heat radiation), UV camera(s), and/or others. While five cameras are illustrated in FIG. 3, HMD 300 may include more or fewer than five cameras.

In some cases, the cameras can be located at specific positions on the HMD 300. For instance, in some cases a first camera (e.g., perhaps camera 320) is disposed on the HMD 300 at a position above a designated left eye position of any users who wear the HMD 300 relative to a height direction of the HMD 300. For instance, the camera 320 is positioned above the pupil 330. As another example, the first camera (e.g., camera 320) is additionally positioned above the designated left eye position relative to a width direction of the HMD. That is, the camera 320 is positioned not only above the pupil 330 but also in-line relative to the pupil 330. When a VR system is used, a camera may be placed directly in front of the designated left eye position. For example, with reference to FIG. 3, a camera may be physically disposed on the HMD 300 at a position in front of the pupil 330 in the z-axis direction.

When a second camera is provided (e.g., perhaps camera 310), the second camera may be disposed on the HMD at a position above a designated right eye position of any users who wear the HMD relative to the height direction of the HMD. For instance, the camera 310 is above the pupil 335. In some cases, the second camera is additionally positioned above the designated right eye position relative to the width direction of the HMD. When a VR system is used, a camera may be placed directly in front of the designated right eye position. For example, with reference to FIG. 3, a camera may be physically disposed on the HMD 300 at a position in front of the pupil 335 in the z-axis direction.

When a user wears HMD 300, HMD 300 fits over the user's head and the HMD 300's display is positioned in front of the user's pupils, such as pupil 330 and pupil 335. Often, the cameras 305-325 will be physically offset some distance from the user's pupils 330 and 335. For instance, there may be a vertical offset in the HMD height direction (i.e., the "Y" axis), as shown by offset 340 (representing the vertical offset between a user's eye and camera 325). Similarly, there may be a horizontal offset in the HMD width direction (i.e., the "X" axis), as shown by offset 345 (representing the horizontal offset between a user's eye and camera 325). Each camera may be associated with a different offset.

In some implementations, the HMD 300 may be used to generate a parallax-corrected passthrough visualization of the user's environment. A "pass-through" visualization refers to a visualization that reflects what the user would see if the user were not wearing the HMD 300, regardless of whether the HMD 300 is included as a part of an AR system, a VR system, or another type of system. To generate this passthrough visualization, the HMD 300 may utilize one or more of its cameras 305-325 to capture its surrounding environment, including any objects in the environment, and to pass that data on to the user to view. In many cases, the passed-through data is modified to reflect or to correspond to a perspective of the user's pupils. The perspective may be determined by any type of eye tracking technique. In some instances, as the camera modules are not telecentric with the user's eyes, the perspective difference between the user's eyes and the camera modules may be corrected to provide parallax-corrected pass-through visualizations.

To convert a raw image into a passthrough image, depth information may be determined from the raw images (or using a separate depth detection system). The depth information may detail the distance from the sensor to any objects captured by the raw images (e.g., a z-axis range or measurement). Once these raw images are obtained, then a depth map can be computed from the depth data embedded or included within the raw images, and passthrough images can be generated (e.g., one for each pupil) using the depth information for any reprojections.

As used herein, a "depth map" details the positional relationship and depths relative to objects in the environment. Consequently, the positional arrangement, location, geometries, contours, and depths of objects relative to one another can be determined. From the depth maps (and possibly the raw images), a 3D representation of the environment can be generated.

Relatedly, from the passthrough visualizations, a user will be able to perceive what is currently in his/her environment without having to remove or reposition the HMD 300. Furthermore, as will be described in more detail later, the disclosed passthrough visualizations may also enhance the user's ability to view objects within his/her environment (e.g., by displaying additional environmental conditions that may not have been detectable by a human eye).

It should be noted that while a portion of this disclosure focuses on generating "a" passthrough image, the implementations described herein may generate a separate passthrough image for each one of the user's eyes. That is, two passthrough images may be generated concurrently with one another. Therefore, while frequent reference is made to generating what seems to be a single passthrough image, the implementations described herein are actually able to simultaneously generate multiple passthrough images.

In some instances, the passthrough images may have various levels of processing performed on the sensors, including denoising, tone mapping, and/or other processing steps to produce high quality imagery. Additionally, camera reprojection steps (e.g., parallax correction) may or may not be performed, as well, to correct for the offset between the user's perspective and the camera position.

As shown in FIG. 3, none of the cameras 305-325 are directly aligned with the pupils 330 and 335. The offsets 340 and 345 introduce differences in perspective (i.e., parallax) as between the cameras 305-325 and the pupils 330 and 335. As noted above, because of the parallax occurring as a result of the offsets 340 and 345, raw images produced by the cameras 305-325, in some instances, are not available for immediate use as passthrough image(s) 350. Thus, parallax correction 355 (aka an image synthesis or reprojection) may be performed on the raw images to transform (or reproject) the perspectives embodied within those raw images to correspond to perspectives of the user's pupils 330 and 335. The parallax correction 355 may include any number of distortion corrections 360 (e.g., to correct for concave or convex wide or narrow angled camera lenses), epipolar transforms 365 (e.g., to parallelize the optical axes of the cameras), and/or reprojection transforms 370 (e.g., to reposition the optical axes so as to be essentially in front of or in-line with the user's pupils).

As noted above, the parallax correction 355 may include performing depth computations to determine the depth of the environment and then reprojecting images to a determined location or as having a determined perspective. As used herein, the phrases "parallax correction" and "image synthesis" may be interchanged with one another and may include performing stereo passthrough parallax correction and/or image reprojection parallax correction.

The reprojections are, in some instances, based on a current pose 375 of the HMD 300 relative to its surrounding environment (e.g., as determined via visual-inertial SLAM). Based on the pose 375 and the depth maps that are generated, the HMD 300 and/or other system is/are able to correct parallax error by reprojecting a perspective embodied by the raw images to coincide with a perspective of the user's pupils 330 and 335.

By performing these different transforms, the HMD 300 is able to perform three-dimensional (3D) geometric transforms on the raw camera images to transform the perspectives of the raw images in a manner so as to correlate with the perspectives of the user's pupils 330 and 335. Additionally, the 3D geometric transforms rely on depth computations in which the objects in the HMD 300's environment are mapped out to determine their depths as well as the pose 375. Based on these depth computations and pose 375, the HMD 300 is able to three-dimensionally reproject or three-dimensionally warp the raw images in such a way so as to preserve the appearance of object depth in the passthrough image(s) 350, where the preserved object depth substantially matches, corresponds, or visualizes the actual depth of objects in the real world. Accordingly, the degree or amount of the parallax correction 355 is at least partially dependent on the degree or amount of the offsets 340 and 345.

By performing the parallax correction 355, the HMD 300 effectively creates "virtual" cameras having positions that are in front of the user's pupils 330 and 335. By way of additional clarification, consider the position of camera 305, which is currently above and to the left of pupil 335. By performing the parallax correction 355, the embodiments programmatically transform images generated by camera 305, or rather the perspectives of those images, so the perspectives appear as though camera 305 were actually positioned immediately in front of pupil 335. That is, even though camera 305 does not actually move, the embodiments are able to transform images generated by camera 305 so those images have the appearance as if camera 305 were coaxially aligned with pupil 335 and, in some instances, at the exact position of pupil 335.

Low Compute High-Resolution Depth Map Generation Using Low-Resolution Cameras

Figure 4:
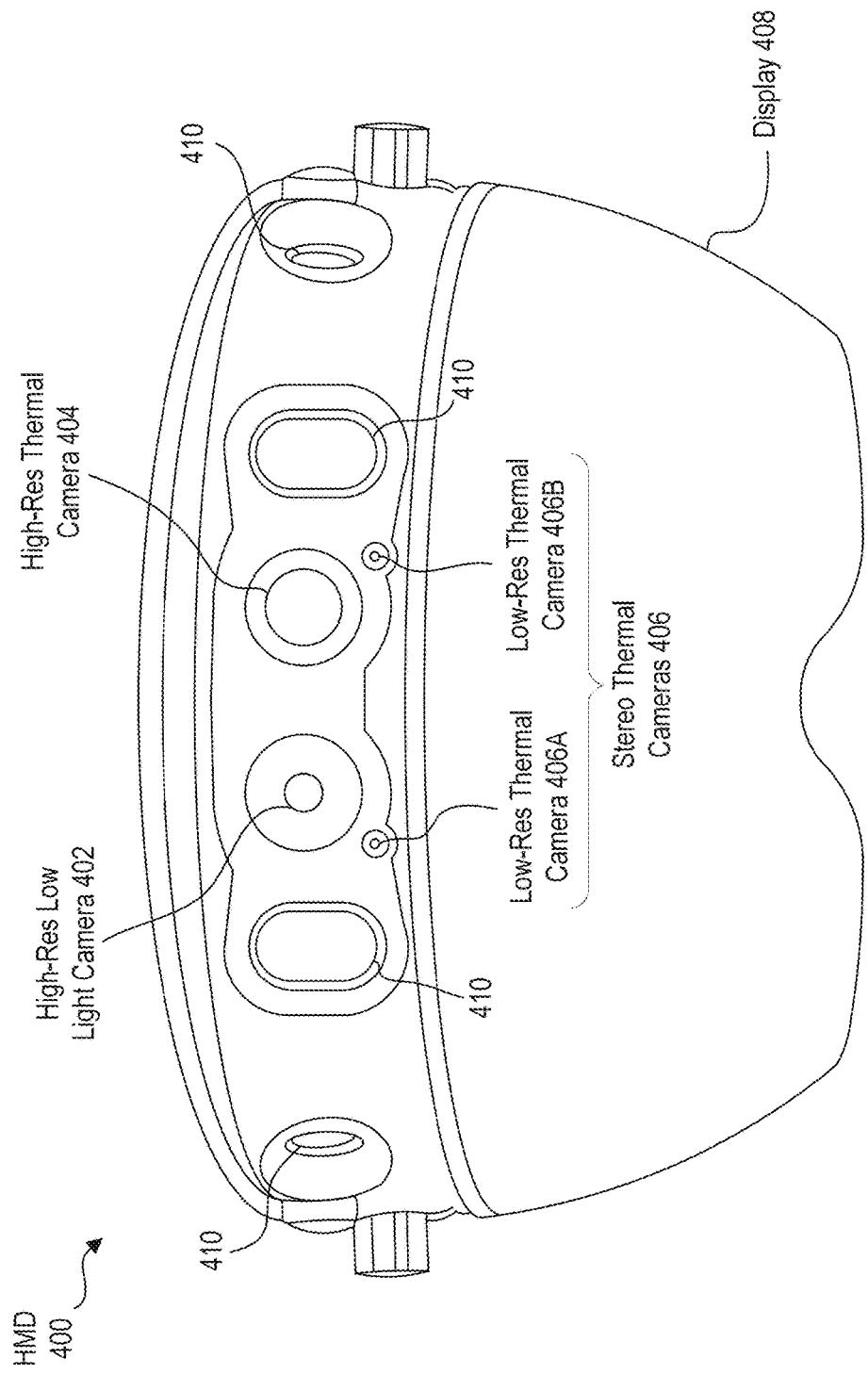
FIG. 4 illustrates an example head-mounted display (HMD) that includes various cameras that may facilitate the disclosed embodiments, including a low-resolution stereo camera pair.

FIG. 4 illustrates an example head-mounted display 400 (HMD 400) that includes various cameras that may facilitate the disclosed embodiments. The HMD 400 may correspond, in at least some respects, to the HMD 300 and/or the system 200 discussed above. As illustrated in FIG. 4, the HMD includes a high-resolution low light camera 402, a high-resolution thermal camera 404, and two low-resolution thermal cameras 406A and 406B.

As noted above a low light camera may comprise image sensing pixels that are configured to detect low numbers of electrons at a high enough frame rate to facilitate image capture in environments that include low ambient light (e.g., under starlight conditions, about 10 lux or below). Furthermore, as noted above, a thermal camera may be configured to detect infrared light to provide images representative of heat radiation from objects within a captured environment.

The image resolution of images captured by the high-resolution low light camera 402 and/or the high-resolution thermal camera 404 is higher than the image resolution of images captured by the low-resolution thermal cameras 406A and 406B. For example, in some instances, the image resolution of the high-resolution low light camera 402 and/or the high-resolution thermal camera 404 is high enough (e.g., 1920×1080, or another value or aspect ratio) for image pixels not to appear divisible to users during presentation to users for various applications, such as passthrough imaging, as discussed above. In contrast, the image resolution of the low-resolution thermal cameras 406A and 406B is lower than the image resolution of the high-resolution low light camera 402 and/or the high-resolution thermal camera (e.g., 480×270, or another value or aspect ratio). For example, images captured by the low-resolution thermal cameras 406A and 406B may appear pixelated if presented to users under normal use conditions (e.g., passthrough imaging).

The low-resolution thermal cameras 406A and 406B form a stereo pair of thermal cameras (i.e., stereo thermal cameras 406), which may be configured to capture temporally synchronized thermal images of an environment that are substantially identical in image resolution, aspect ratio, etc. Although, in many instances, the low-resolution thermal cameras 406A and 406B are not able to capture images of sufficient fidelity for presentation to users to provide desirable user experiences, the low-resolution thermal cameras may facilitate low compute depth map computation and may avoid the need to implement stereo pairs of high-resolution cameras (e.g., a second high-resolution thermal camera or a second high-resolution low light camera) to facilitate pass-through imaging of an environment, as described in more detail hereinbelow.

As noted above, the low-resolution thermal cameras 406A and 406B operate by detecting heat radiated within a captured scene. In some implementations, thermal cameras can advantageously operate in the absence of light (e.g., in pitch black environments) and/or in low visibility environments (e.g., where there is smoke or fog in the environment). Accordingly, the stereo thermal cameras 406 may be able to capture low-resolution images that are usable for obtaining depth information (as described in more detail hereafter) in a variety of environments, which may be beneficial for users that utilize the HMD 400 in a variety of environments.

Although the present examples focus, in at least some respects, on particular camera modalities (e.g., thermal and low light) and/or particular numbers of cameras (e.g., two high-resolution cameras of different modalities and a stereo pair of low-resolution cameras of the same modality), one will appreciate, in view of the present disclosure, that the principles described herein are not limited to the particular configurations of the present examples. For example, in accordance with the present disclosure, a system for facilitating low compute high-resolution depth map computation using low-resolution cameras may include any combination of visible light cameras, infrared cameras, ultraviolet cameras, low light cameras, and/or cameras of any modality. For instance, in some implementations, an HMD may implement stereo low-resolution low light cameras instead of stereo low-resolution thermal cameras. Stereo low-resolution low light cameras may, in some instances, provide high contrast and/or high fidelity (e.g., as compared to low-resolution thermal cameras), but may fail to operate desirably in pitch black environments, in the presence of smoke or fog, etc.

Furthermore, a system may include only a single high-resolution camera or more than two high-resolution cameras, and the high-resolution camera(s) may be of a same or different camera modality as the stereo pair of low-resolution cameras.

FIG. 4 also illustrates that the HMD 400 may include any number of other cameras 410 for facilitating various functions associated with providing mixed-reality (MR) experiences. For instance, the other cameras 410 may facilitate simultaneous localization and mapping (SLAM), object tracking (e.g., hand tracking), and/or other functions. Furthermore, FIG. 4 illustrates that the HMD 400 includes a display 408 for displaying virtual content to a user wearing the HMD 400. For example, in some instances, the display 408 may include or be associated with laser diodes, mirrors (e.g., microelectromechanical system (MEMS) mirrors), waveguides, diffraction gratings, LCD displays (for VR systems), and/or other elements for displaying images to user eyes. In some instances, the display 408 includes separate optical/display systems for displaying per-eye images to the user.

Figure 5A:
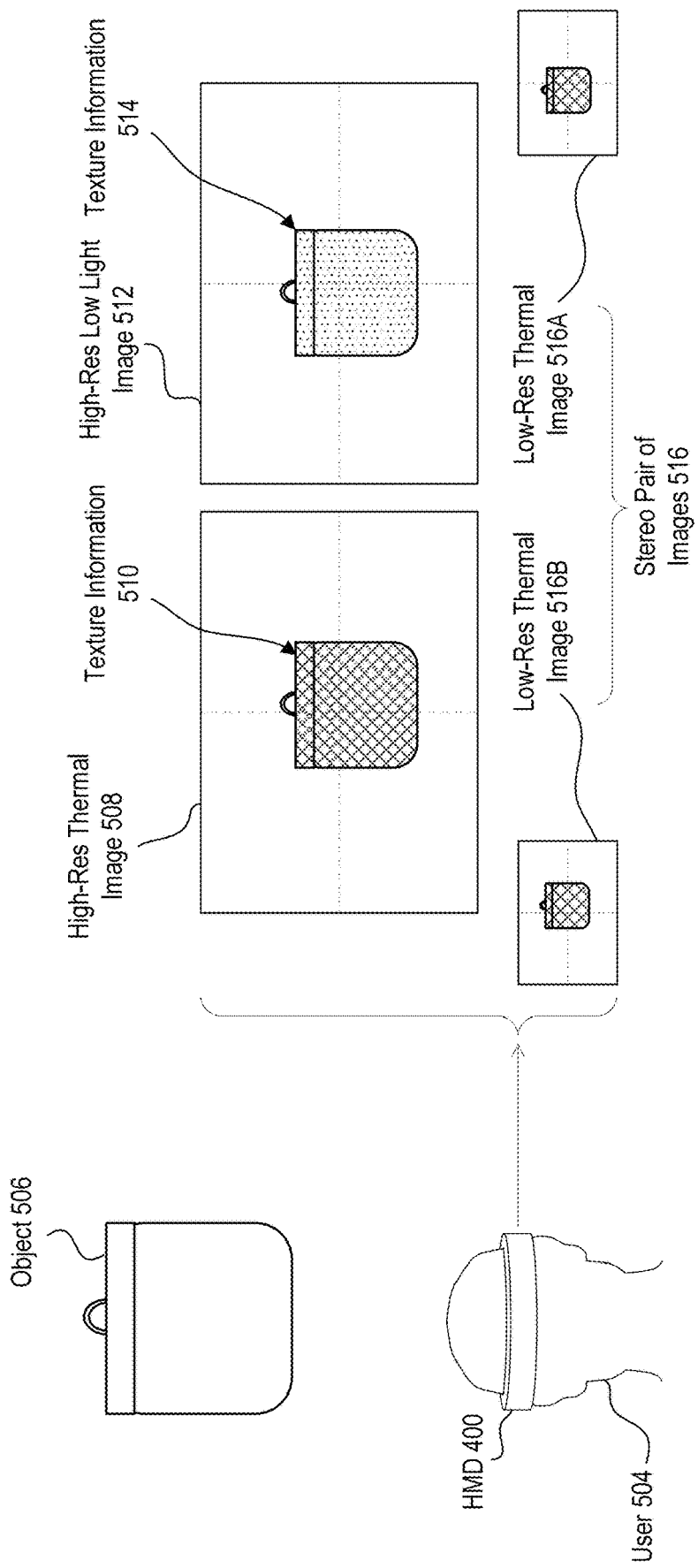
FIGS. 5A and 5B illustrate an example of capturing images of an environment using various cameras of an HMD and generating a low-resolution depth map based on at least a low-resolution stereo pair of images.

The HMD may capture images of objects within an environment using the cameras thereof, as depicted in FIG. 5A. FIG. 5A illustrates the HMD 400 worn by a user 504 as the HMD 400 captures images of an object 506 within an environment. FIG. 5A illustrates a high-resolution thermal image 508 (e.g., captured by the high-resolution thermal camera 404 of the HMD 400), a high-resolution low light image 512 (e.g., captured by the high-resolution low light camera 402 of the HMD 400), and low-resolution thermal images 516A and 516B (e.g., captured by the low-resolution thermal cameras 406A and 406B of the HMD 400). The low-resolution thermal images 516A and 516B form a stereo pair of images 516, upon which depth computations (e.g., stereo matching) may be performed.

The high-resolution thermal image 508 captures texture information 510 that describes the thermal radiation properties of the object 506 at the time of capture (represented in FIG. 5A by a crosshatch pattern fill on the representation of the object 506 in the high-resolution thermal image 508). The high-resolution low light image 512 captures different texture information 514 that describes textures for the object 506 that are observable the visible spectrum (represented in FIG. 5A by a dotted pattern fill on the representation of the object 506 in the high-resolution low light image 512). As will be described hereinafter, the texture information 510 and/or 514 may provide a basis for generating pass-through views of the object 506 (e.g., for presentation on the display 408 of the HMD 400).

The various images of FIG. 5A include centerlines depicted as dashed lines extending horizontally and vertically on the various images. The centerlines are included in FIG. 5A (and in other Figures) to more clearly depict the spatial differences between the various images captured by the cameras of the HMD 400. For example, the high-resolution thermal image 508 depicts the object 506 with the handle on the top thereof intersecting with the vertical centerline with the majority of the handle being positioned on the right side of the vertical centerline. In contrast, the high-resolution low light image depicts the object 506 with the handle on the top thereof intersecting with the vertical centerline with the majority of the handle being positioned on the left side of the vertical centerline. These spatial differences between the high-resolution thermal image 508 and the high-resolution low light image 512 result from the physical displacement between the high-resolution thermal camera 404 and the high-resolution low light camera 402 on the HMD 400.

FIG. 5A also illustrates that spatial differences exist between the low-resolution thermal images 516A and 516B and (i) the high-resolution thermal image 508, the high-resolution low light image 512, and each other. For example, low-resolution thermal image 516B depicts the object 506 with the handle positioned entirely to the right of the vertical centerline, whereas low-resolution thermal image 516A depicts the object 506 with the handle positioned entirely to the left of the vertical centerline.

Figure 5B:
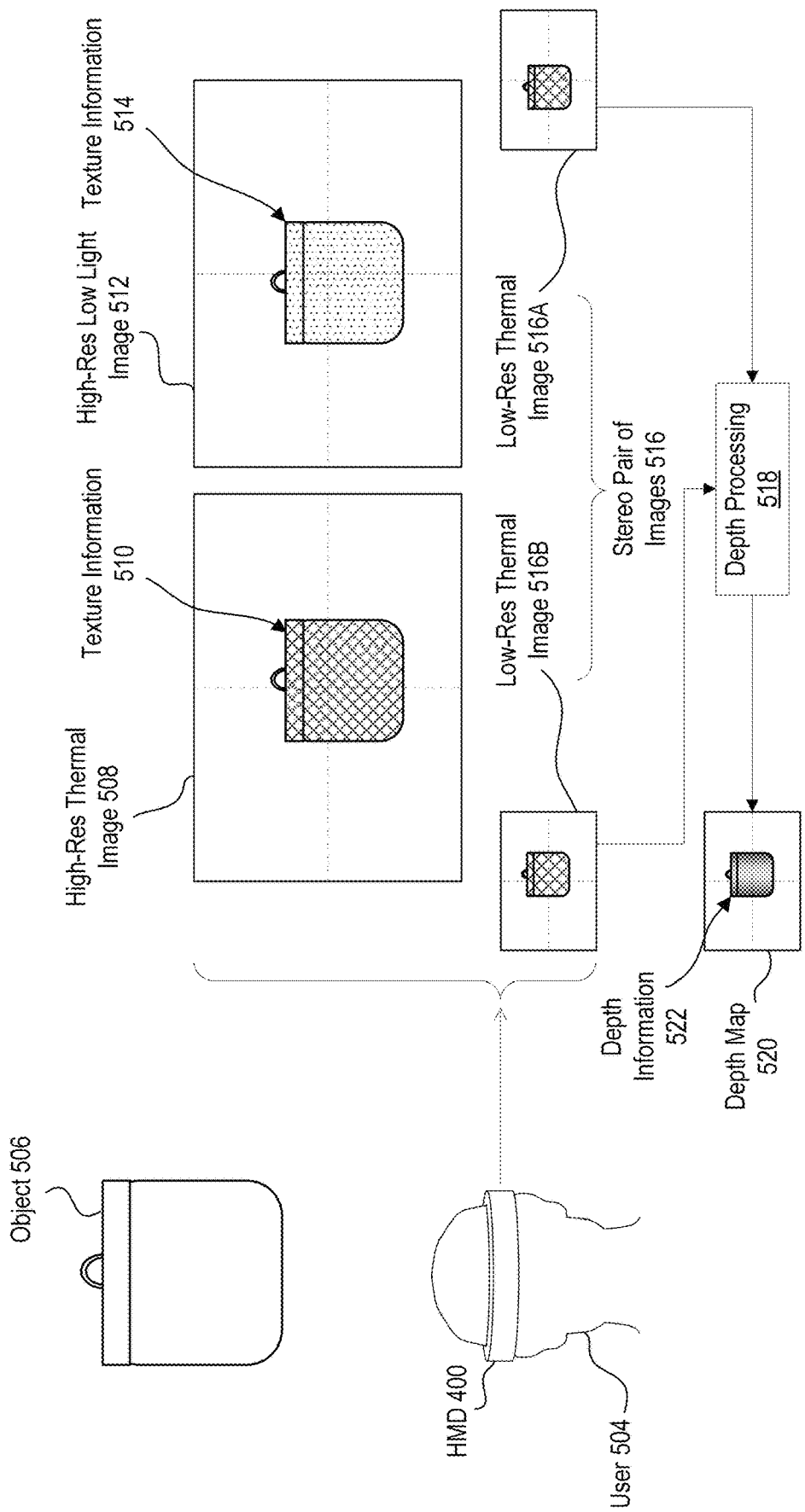

At least some of the images depicted in FIG. 5A may be captured or obtained by a system (e.g., system 200, HMD 400, etc.) to facilitate low-compute high-resolution depth map generation using low-resolution images. To facilitate low-compute high-resolution depth map generation using low-resolution images, a system may generate a low-resolution depth map using the low-resolution thermal images 516A and 516B. FIG. 5B illustrates low-resolution thermal images 516A and 516B being provided as input to depth processing 518 for generating depth information for objects captured in the low-resolution thermal images 516A and 516B (e.g., depth information describing object 506 relative to the low-resolution thermal cameras 406A and 406B at the time of capturing the stereo pair of images 516).

Depth processing 518 to calculate depth information may be performed in various ways, including stereo matching. To perform stereo matching, a pair of images is obtained (e.g., low-resolution thermal images 516A and 516B). A rectification process is typically performed, whereby corresponding pixels in the different images of the pair of images that represent common 3D points in the environment become aligned along scanlines (e.g., horizontal scanlines, vertical scanlines, epipolar lines, etc.). For rectified images, the coordinates of the corresponding pixels in the different images only differ in one dimension (e.g., the dimension of the scanlines). A stereo matching algorithm may then search along the scanlines to identify pixels in the different images that correspond to one another (e.g., by performing pixel patch matching to identify pixels that represent common 3D points in the environment) and identify disparity values for the corresponding pixels. Disparity values may be based on the difference in pixel position between the corresponding pixels in the different images that describe the same portion of the environment. Per-pixel depth may be determined based on per-pixel disparity values, providing a depth map.

FIG. 5B illustrates the output of the depth processing 518 as a depth map 520, which includes depth information 522. As noted above, a depth map 520 can describe per-pixel distance between objects captured in the stereo pair of images and one or more of the cameras that captured the stereo pair of images. FIG. 5B illustrates the depth map 520 in the geometry of low-resolution thermal image 516A. Stated differently, the objects represented in the low-resolution thermal image 516A and the depth map 520 are spatially aligned. As noted above, a system may generate a depth map in the geometry of both images of the stereo pair of images 516 and may perform any processing described herein without loss of generality to generate multiple parallax-corrected views (e.g., one for a user's right eye and one for a user's left eye).

As discussed above, performing depth processing 518 on low-resolution images is much less computationally costly than performing depth processing on high-resolution images, and utilizing low-resolution images to capture the stereo pair of images for the depth processing allows the HMD 400 to omit stereo pairs of high-resolution cameras. However, as indicated above, spatial differences exist between the depth map 520 (which is in the geometry of the low-resolution thermal image 516A) and both the high-resolution thermal image 508 and the high-resolution low light image 512. Furthermore, the depth map 520 has an image resolution that is similar to the low-resolution thermal images 516A and 516B, and therefore has a lower image resolution than the high-resolution thermal image 508 and/or the high-resolution low light image 512.

These spatial and image resolution differences present a problem for using depth information 522 from the depth map 520 and texture information 510 or 514 to generate parallax-corrected views. However, these hurdles can be overcome by utilizing reprojection operations and upsampling operations, as described hereinbelow.

Figure 6A:
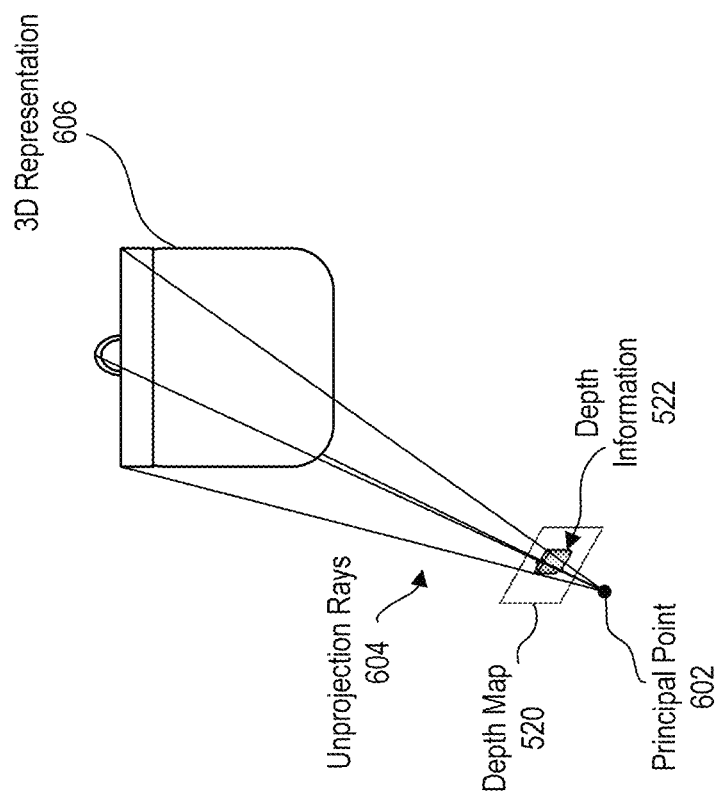
FIGS. 6A and 6B illustrate a conceptual representation of reprojecting a high-resolution image to correspond to a capture perspective of a low-resolution depth map.
Figure 6B:
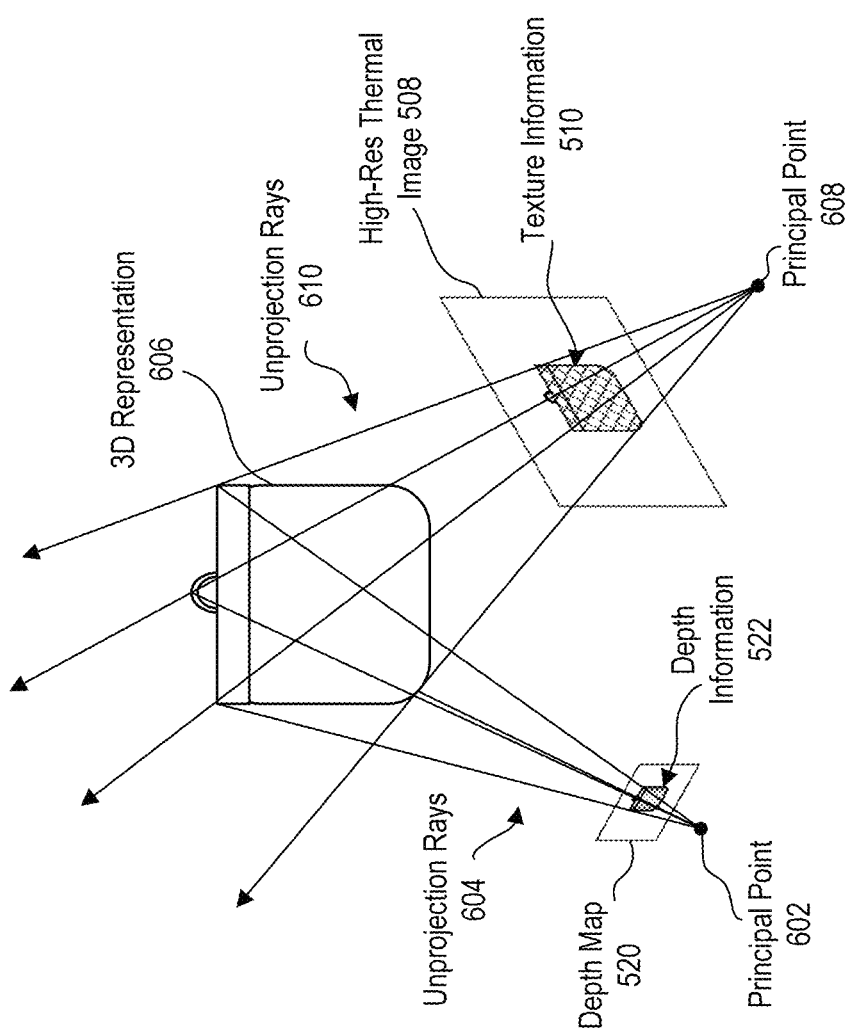

FIGS. 6A and 6B illustrate a conceptual representation of reprojecting a high-resolution image to correspond to a capture perspective of a low-resolution depth map. FIGS. 6A and 6B illustrate how texture information 510 from the high-resolution thermal image may be reprojected to be spatially aligned with depth information 522 from the depth map 520. FIG. 6A illustrates the depth map 520 with unprojection rays 604 extending from a principal point 602 through various pixels of depth information 522 of the depth map 520. Using pinhole camera terminology for illustrative purposes, the principal point 602 corresponds to an optical center or camera center of the low-resolution thermal camera 406B (which is the camera that the depth map 520 is spatially aligned with) while the low-resolution thermal camera 406B captured low-resolution thermal image 516B for forming the depth map 520.

The unprojection rays 604 are illustrated as being cast from this principal point 602 through the pixels of depth information 522 represented in the depth map 520 as the pixels of depth information lie on a front image plane positioned about the principal point 602. Each unprojection ray 604 is extended through a respective pixel of depth information 522 to a distance that corresponds to the depth value of the respective pixel of depth information 522. These unprojection rays 604 provide a plurality of 3D points or coordinates that depict a 3D representation 606 of the object 506 captured in the depth map 520.

Each 3D point or coordinate of the 3D representation 606 of the object 506 can be associated with the particular pixel of depth information 522 that the corresponding unprojection ray 604 was cast through to provide the 3D point or coordinate. In this way, if pixels of texture information 510 of the high-resolution thermal image 508 can be associated with 3D points or coordinates of the 3D representation 606, the pixels of texture information 510 can be associated and/or aligned with the depth information 522 of the depth map 520.

FIG. 6B further illustrates the high-resolution thermal image 508 with unprojection rays 610 extending from a principal point 608 of the high-resolution thermal image 508 through various pixels of the texture information 510 of the high-resolution thermal image 508. The principal point 608 corresponds to an optical center or camera center of the high-resolution thermal camera 404 while the high-resolution thermal camera 404 captured the high-resolution thermal image 508.

The unprojection rays 610 are illustrated as being cast from the principal point 608 through the pixels of texture information 510 as the pixels of texture information 510 lie on a front image plane positioned about the principal point 608. At least some of the unprojection rays 610 are extended through a respective pixel of texture information 510 until the unprojection rays 610 intersect with a 3D point of the 3D representation 606. Each pixel of texture information 510 through which an unprojection ray 610 passes that intersects with a particular 3D point of the 3D representation 606 can be associated with the pixel of depth information 522 of the depth map 520 that an unprojection ray 604 passed through to generate the particular 3D point of the 3D representation 606.

By this association using the 3D points of the 3D representation 606 as an intermediary, pixels of texture information 510 can be associated with pixels of depth information 522 of the depth map 520, even though both are captured from different camera perspectives. Stated differently, a system can reproject the texture information 510 to correspond to the perspective associated with the depth map 520 (e.g., to spatially align the texture information 510 with the depth information 522 of the depth map 520) by unprojecting the texture information onto the 3D representation 606 and projecting onto the depth map 520 (or toward the principal point 602 of the depth map 520).

Figure 7:
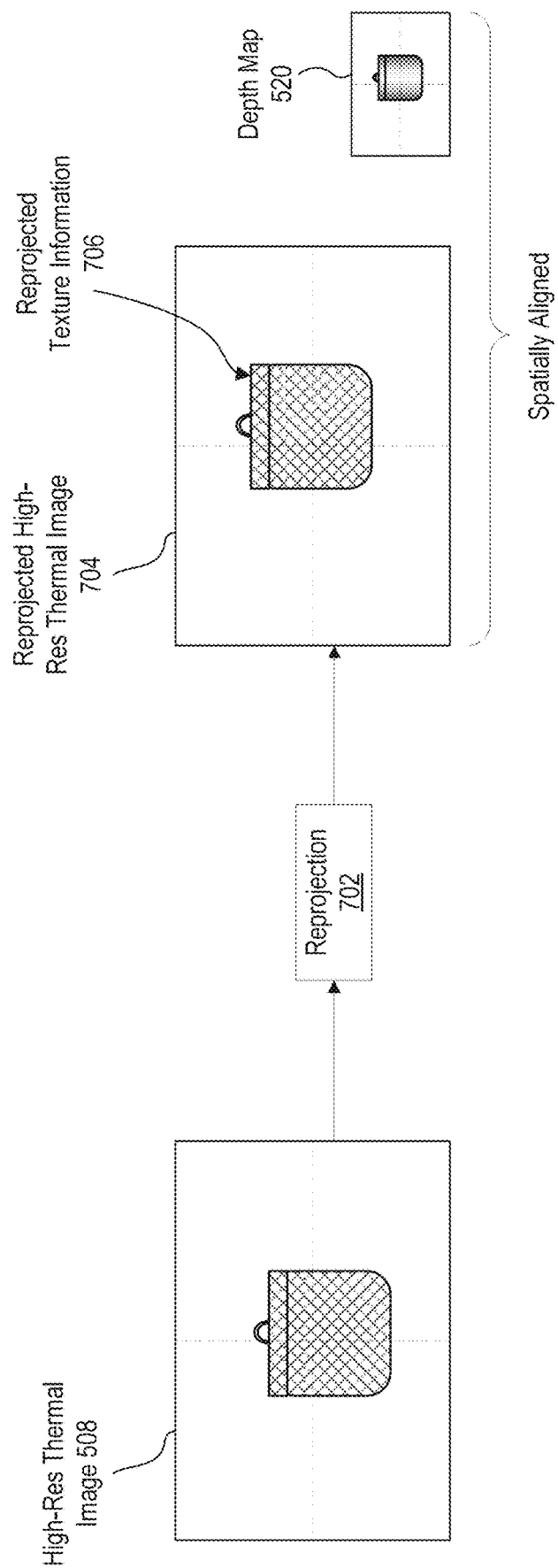
FIG. 7 illustrates an example of a reprojected high-resolution image that is spatially aligned with a low-resolution depth map.

FIG. 7 depicts the high-resolution thermal image 508 being provided as input to reprojection 702, which may carry out operations as conceptually described with reference to FIGS. 6A and 6B and can be performed utilizing any reprojection techniques known in the art. As discussed above, the reprojection 702 is at least partially based on the depth information 522 from the depth map 520. The output of the reprojection 702, as shown in FIG. 7, comprises a reprojected high-resolution thermal image 704, which includes reprojected texture information 706. FIG. 7 shows that the reprojected high-resolution thermal image 704 is spatially aligned with the depth map 520, as discussed above. For example, both the reprojected high-resolution thermal image 704 and the depth map 520 depict the object 506 with the handle on the top thereof being positioned entirely to the right of the vertical centerline.

Although the high-resolution thermal image 704 and the depth map 520 are spatially aligned, the two images have different image resolutions, with the high-resolution thermal image 704 having a higher image resolution than the depth map 520 (as evident from FIG. 7). Differences in resolution between depth information from a depth map (e.g., depth map 520) and texture information from a texture image (e.g., reprojected high-resolution thermal image 704) can reduce the quality of parallax-corrected images generated using the depth information and the texture information.

Figure 8:
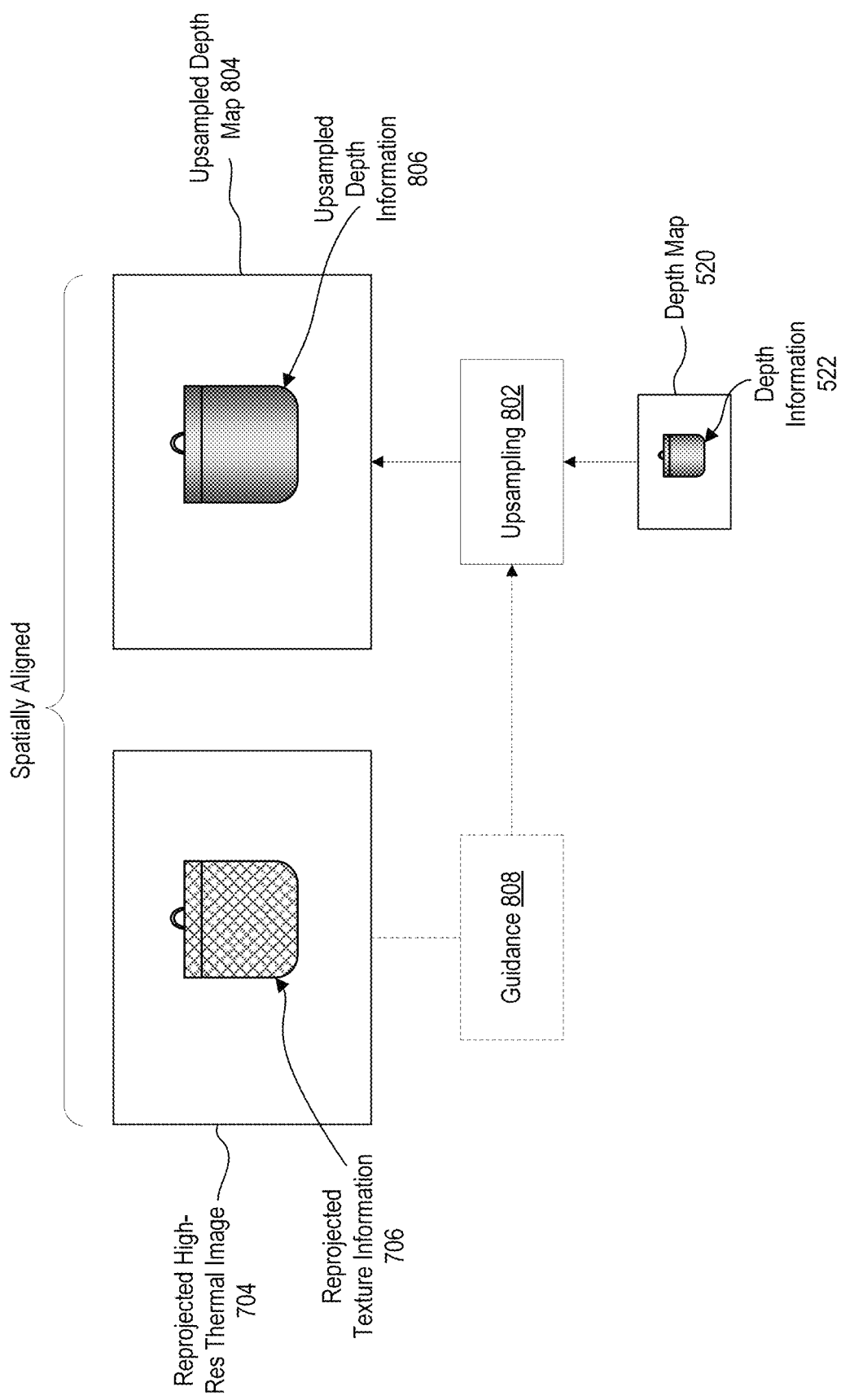
FIG. 8 illustrates an example of upsampling a low-resolution depth map to generate an upsampled depth map 804 that is spatially aligned with a reprojected high-resolution image.

Accordingly, FIG. 8 illustrates generating an upsampled depth map 804, which may comprise an image resolution that matches the image resolution of the reprojected high-resolution thermal image 704. In particular, FIG. 8 shows the depth map 520 provided as input to upsampling 802 for generating the upsampled depth map 804 with upsampled depth information 806 that is spatially aligned with the reprojected texture information 706 of the reprojected high-resolution thermal image 704.

Upsampling 802 for generating a high-resolution image from a low-resolution image may employ techniques such as spatial domain approaches (e.g., sample transformation using the sampling theorem and the Nyquist theorem), frequency domain approaches (e.g., registering images using properties of the discrete Fourier transform), learning based techniques (e.g., adaptive regularization, pair matching, etc.), iterative reconstruction and interpolation based techniques (e.g., iterative back projection, pixel replication, nearest-neighbor interpolation, bilinear or bicubic interpolation, etc.), dynamic tree and wavelet based resolution techniques (e.g., mean field approaches), and/or others.

In some instances, upsampling 802 comprises or utilizes a filtering algorithm, such as an edge-preserving filtering operation that may optionally utilize a guidance image to improve the output of the algorithm. Such edge-preserving filters may include, by way of nonlimiting example, a joint bilateral filter, a guided filter, a bilateral solver, etc. FIG. 8 illustrates an example implementation in which the reprojected high-resolution thermal image 704 is provided as guidance 808 to upsampling 802 to facilitate improved alignment between the reprojected high-resolution thermal image 704 and the upsampled depth map 804 (i.e., the output of the upsampling 802).

As noted above, FIG. 8 illustrates the reprojected texture information 706 of the reprojected high-resolution thermal image 704 as being spatially aligned with the upsampled depth information 806 of the upsampled depth map 804. Furthermore, as illustrated in FIG. 8, both the reprojected high-resolution thermal image 704 and the upsampled depth map 804 comprise a same image resolution. Accordingly, the reprojected texture information 706 and the upsampled depth information 806 may be used in conjunction with one another to form a parallax-corrected image for display to a user, as discussed hereinabove (e.g., with reference to FIG. 3).

For example, a system may utilize the upsampled depth information 806 to again reproject the already reprojected texture information 706 to correspond to the perspective of one or more of a user's eyes (e.g., eye(s) of user 504). Such reprojection may include, by way of non-limiting example, unprojecting each pixel of the reprojected texture information 706 to a distance indicated by a corresponding pixel of the upsampled depth information 806 that has the same pixel coordinate. The unprojections may provide 3D points in 3D space, and these 3D points may be projected toward a principal point associated with the user's perspective and onto a front-facing image plane to form a parallax-corrected image. The parallax-corrected image may be displayed on one or more portions of a display 408 of the HMD 400 (see FIG. 4), thereby providing the user with a pass-through image of their environment (e.g., a pass-through thermal image of the environment).

Operations similar to those discussed above for generating a reprojected high-resolution thermal image 704 may also be performed, without loss of generality, to generate a reprojected high-resolution low light image (or a reprojected high-resolution image that is of any different camera modality than the stereo pair of images 516 used to form the low-resolution depth map 520), even though the high-resolution thermal image 508 and the high-resolution low light image 512 are spatially misaligned with one another.

Figure 9:
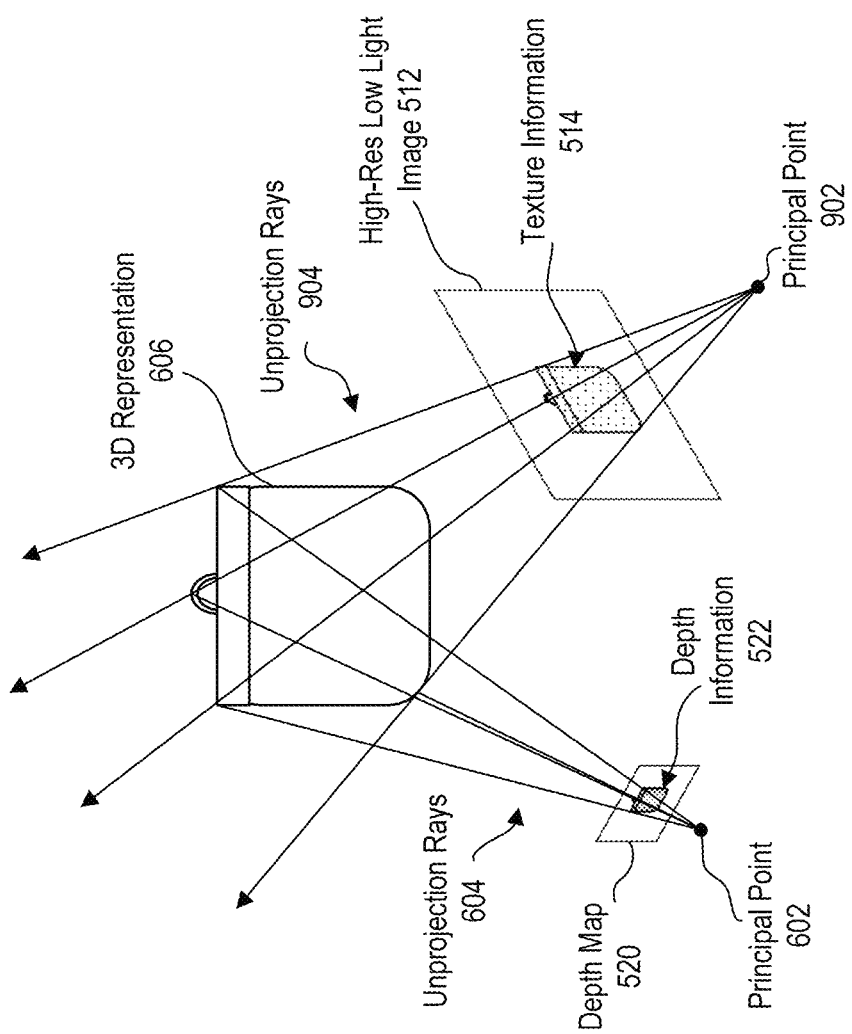
FIG. 9 illustrates a conceptual representation of reprojecting an additional high-resolution image of a different camera modality to correspond to a capture perspective of a low-resolution depth map.

FIG. 9 illustrates a conceptual representation of reprojecting the high-resolution low light image 512 to correspond to a capture perspective associated with the low-resolution depth map 520. Similar to FIGS. 6A and 6B above, FIG. 9 illustrates the depth map 520 with unprojection rays 604 extending from a principal point 602 through various pixels of depth information 522 of the depth map 520. The unprojection rays 604 are illustrated as being cast from this principal point 602 through the pixels of depth information 522 represented in the depth map 520 as the pixels of depth information lie on a front image plane positioned about the principal point 602. Each unprojection ray 604 is extended through a respective pixel of depth information 522 to a distance that corresponds to the depth value of the respective pixel of depth information 522. These unprojection rays 604 provide a plurality of 3D points or coordinates that depict a 3D representation 606 of the object 506 captured in the depth map 520.

Each 3D point or coordinate of the 3D representation 606 of the object 506 can be associated with the particular pixel of depth information 522 that the corresponding unprojection ray 604 was cast through to provide the 3D point or coordinate. In this way, if pixels of texture information 514 of the high-resolution low light image 512 can be associated with 3D points or coordinates of the 3D representation 606, the pixels of texture information 514 can be associated and/or aligned with the depth information 522 of the depth map 520.

FIG. 9 further illustrates the high-resolution low light image 512 with unprojection rays 904 extending from a principal point 902 of the high-resolution low light image 512 through various pixels of the texture information 514 of the high-resolution low light image 512. The principal point 902 corresponds to an optical center or camera center of the high-resolution low light camera 402 while the high-resolution low light camera 402 captured the high-resolution low light image 512.

The unprojection rays 904 are illustrated as being cast from the principal point 902 through the pixels of texture information 514 as the pixels of texture information 514 lie on a front image plane positioned about the principal point 902. At least some of the unprojection rays 904 are extended through a respective pixel of texture information 514 until the unprojection rays 904 intersect with a 3D point of the 3D representation 606. Each pixel of texture information 514 through which an unprojection ray 904 passes that intersects with a particular 3D point of the 3D representation 606 can be associated with the pixel of depth information 522 of the depth map 520 that an unprojection ray 604 passed through to generate the particular 3D point of the 3D representation 606.

By this association using the 3D points of the 3D representation 606 as an intermediary, pixels of texture information 514 can be associated with pixels of depth information 522 of the depth map 520, even though both are captured from different camera perspectives. Stated differently, a system can reproject the texture information 514 to correspond to the perspective associated with the depth map 520 (e.g., to spatially align the texture information 514 with the depth information 522 of the depth map 520) by unprojecting the texture information 514 onto the 3D representation 606 and projecting onto the depth map 520 (or toward the principal point 602 of the depth map 520).

Figure 10:
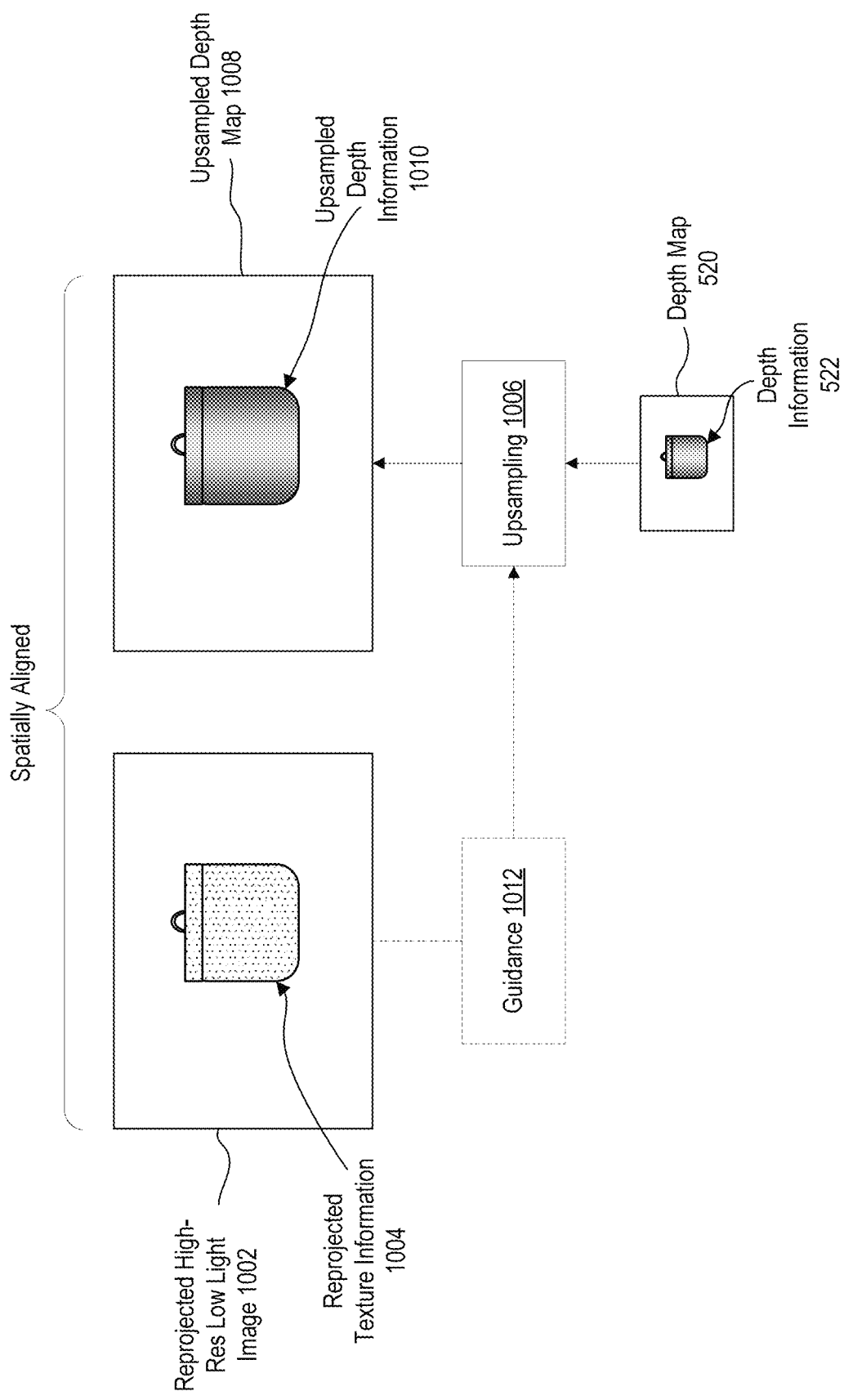
FIG. 10 illustrates an example of upsampling a low-resolution depth map to generate an upsampled depth map 804 that is spatially aligned with the additional reprojected high-resolution image of the different camera modality.

FIG. 10 illustrates a reprojected high-resolution low light image 1002, which may be generated using a reprojection operation based on the depth information 522 of the depth map 520, similar to those discussed above (e.g., reprojection 702 from FIG. 7). The reprojected high-resolution low light image 1002 includes reprojected texture information 1004. FIG. 10 also illustrates generating an upsampled depth map 1008, which may comprise an image resolution that matches the image resolution of the reprojected high-resolution low light image 1002. In particular, FIG. 10 shows the depth map 520 provided as input to upsampling 1006 for generating the upsampled depth map 1008 with upsampled depth information 1010 that is spatially aligned with the reprojected texture information 1004 of the reprojected high-resolution low light image 1002. In some instances, the upsampling 1006 utilizes one or more aspects of the reprojected high-resolution low light image 1002 as an input (e.g., guidance 1012) for generating the upsampled depth map 1008.

As noted above, FIG. 10 illustrates the reprojected texture information 1004 of the reprojected high-resolution low light image 1002 as being spatially aligned with the upsampled depth information 1010 of the upsampled depth map 1008. Furthermore, as illustrated in FIG. 10, both the reprojected high-resolution low light image 1002 and the upsampled depth map 1008 comprise a same image resolution. Thus, a system may utilize the upsampled depth information 1010 to generate a parallax-corrected image by reprojecting the already reprojected texture information 1004 to correspond to the perspective of one or more of a user's eyes. The parallax-corrected image may be displayed on one or more portions of a display 408 of the HMD 400 (see FIG. 4). Such a parallax-corrected image may comprise a pass-through image of the captured environment (e.g., a pass-through low light image of the environment).

It will be appreciated, in view of the present disclosure, that a system may perform operations to generate two parallax-corrected images using two different high-resolution images captured by high-resolution cameras of different camera modalities. For example, a system may generate a parallax-corrected low light image based on the high-resolution low light image 512 and may also generate a parallax-corrected thermal image based on the high-resolution thermal image 508. These images may be fused or combined together to generate a composite pass-through image for presentation to the user that captures information about an environment obtained by multiple camera modalities. It should be noted that when multiple parallax-corrected images are generated, upsampled depth maps need not be duplicatively generated, and depth information from the same upsampled depth map may be used to generate multiple parallax-corrected images based on high-resolution texture information captured by different high-resolution cameras (e.g., by generating reprojected texture information by first reprojecting other high-resolution texture information to correspond to the perspective of the upsampled depth map and then again reprojecting the already reprojected texture information to correspond to the perspective of a user's eye).

Figure 11:
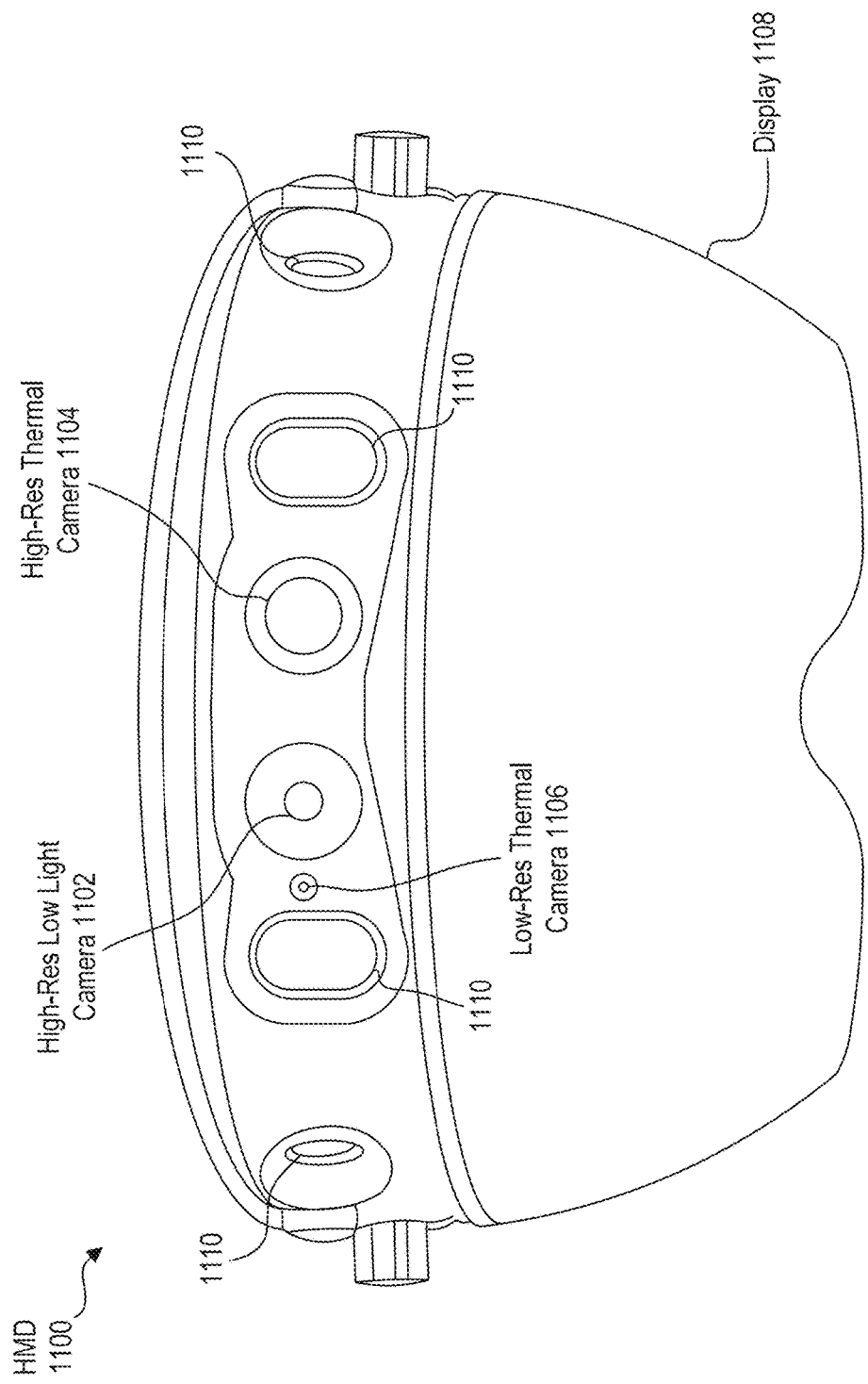
FIG. 11 illustrates an alternative embodiment of an HMD that includes a single low-resolution camera, rather than a stereo pair of low-resolution cameras.

FIG. 11 illustrates an alternative embodiment of an HMD 1100 that may be used to generate high-resolution depth maps using low-resolution images. HMD 1100 is similar in many respects to HMD 400 from FIG. 4. For example, the HMD 1100 includes a high-resolution low light camera 1102, a high-resolution thermal camera 1104, a display 1108, and other camera(s) 1110. A key difference between HMD 1100 and HMD 400 is that HMD 1100 includes only a single low-resolution thermal camera 1106 rather than a stereo pair of low-resolution thermal cameras.

Figure 12:
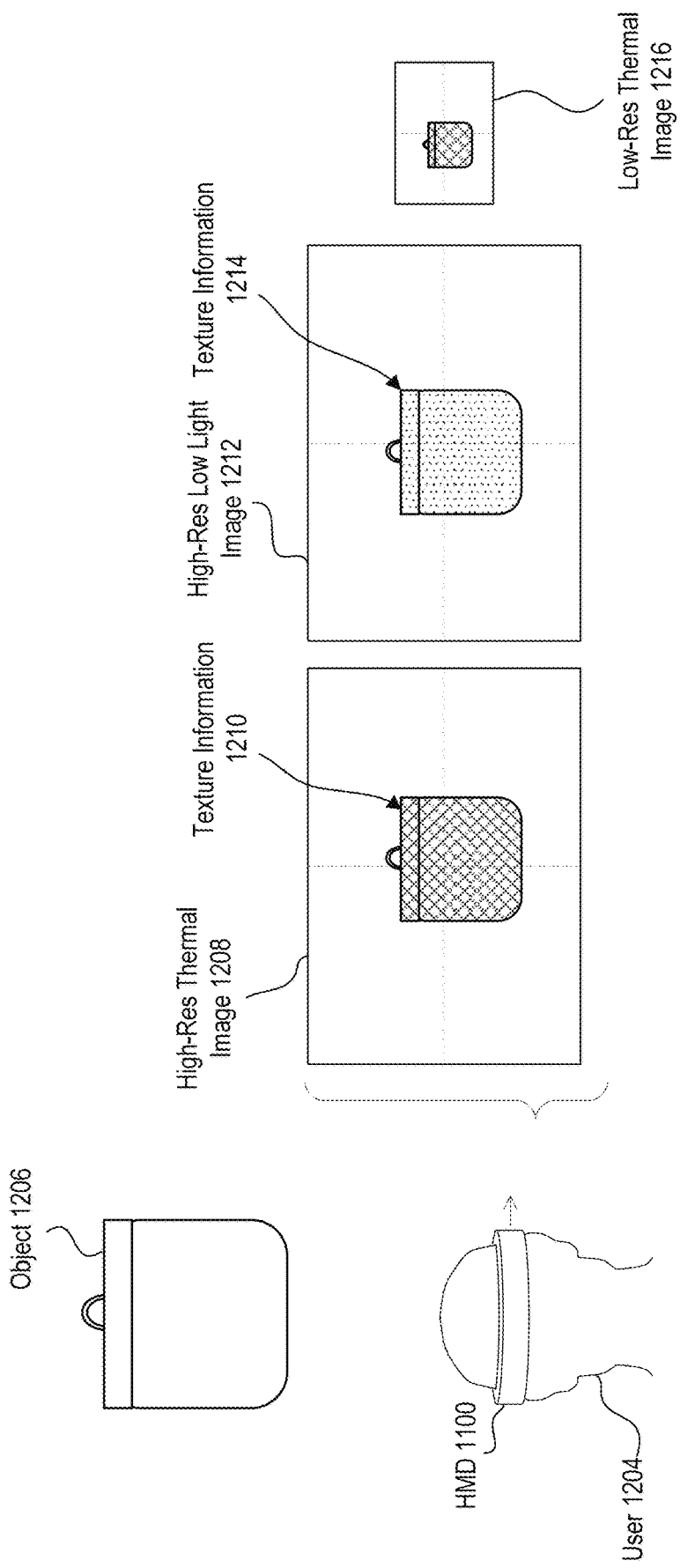
FIG. 12 illustrates an example of capturing images of an environment using various cameras of the HMD that includes a single low-resolution camera.

FIG. 12 illustrates the HMD 1100 worn by a user 1204 as the HMD 1100 captures images of an object 1206 within an environment. FIG. 12 illustrates a high-resolution thermal image 1208 (e.g., captured by high-resolution thermal camera 1104), a high-resolution low light image 1212 (e.g., captured by high-resolution low light camera 1102), and a low-resolution thermal image 1216 (e.g., captured by low-resolution thermal camera 1106). The high-resolution thermal image 1208 captures texture information 1210 that describes thermal radiation properties of the object 506 at the time of capture, and the high-resolution low light image 1212 captures texture information 1214 describing textures of the object 506 that are observable in the visible spectrum. Similar to the spatial misalignments discussed hereinabove with reference to FIG. 5A, Spatial misalignments exist among the various images shown in FIG. 12.

Figure 13:
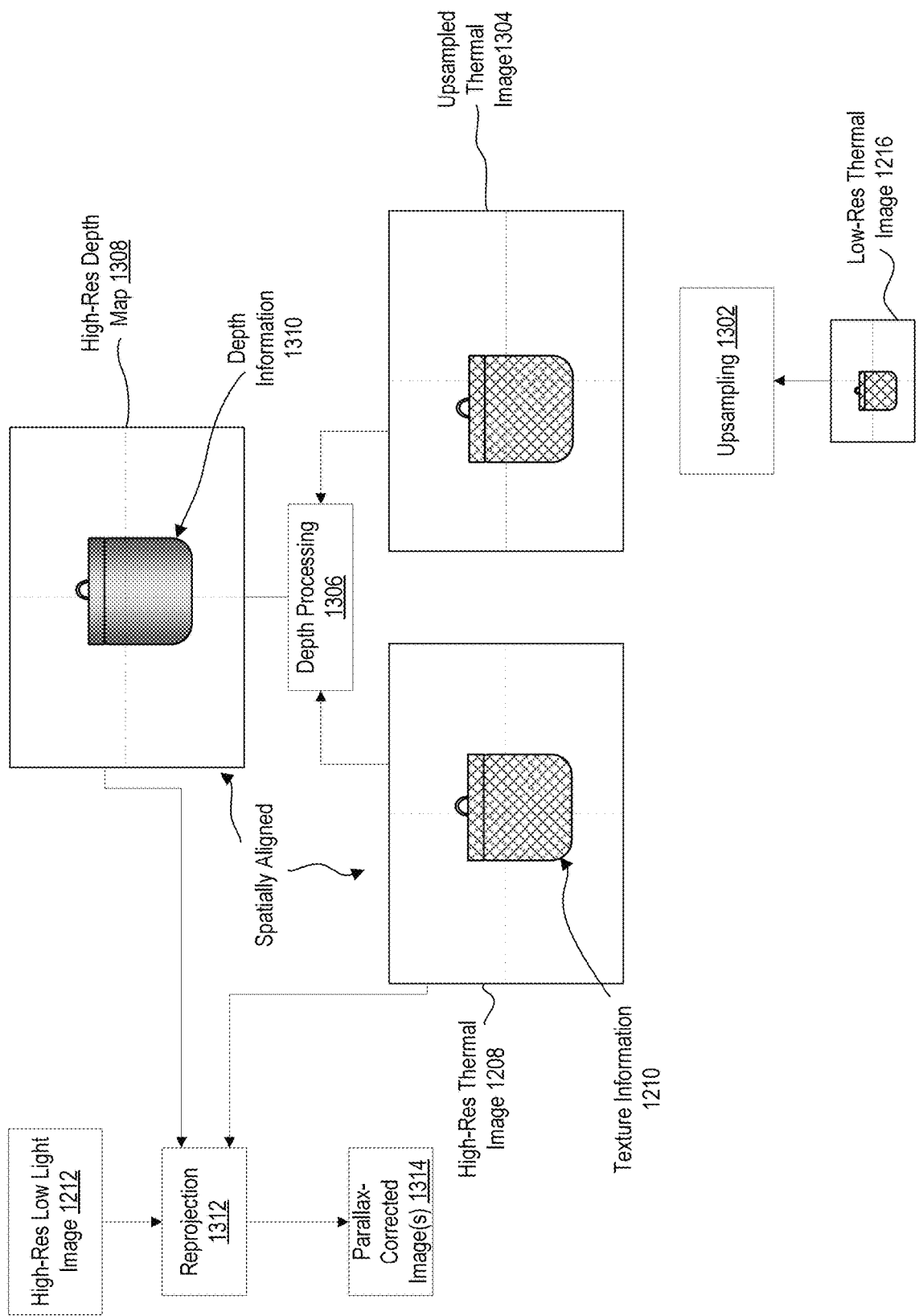
FIG. 13 illustrates a conceptual representation of upsampling a captured low-resolution image to generate a high-resolution depth map.
Figure 14:
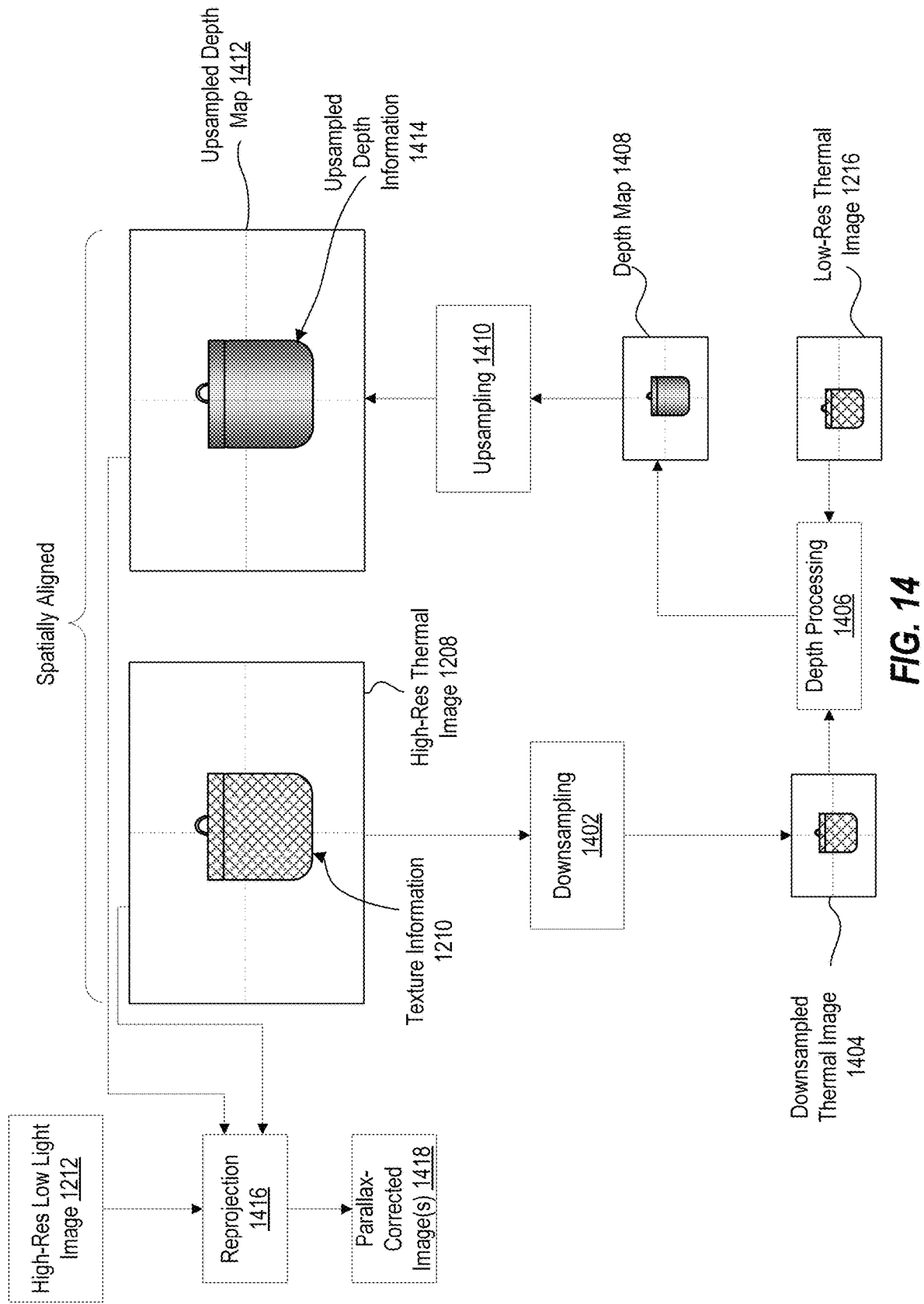
FIG. 14 illustrates a conceptual representation of downsampling a captured high-resolution image to generate a low-resolution depth map, and upsampling the low-resolution depth map.

As will be described herein, in some instances, a high-resolution depth map and high-resolution parallax-corrected images may be generated in the absence of any stereo camera pair or stereo pair of images captured by stereo cameras. Such functionality may be facilitated in multiple ways, in accordance with the present disclosure. FIG. 13 provides one example technique for generating a high-resolution depth map in the absence of a stereo pair of images captured by stereo cameras, and FIG. 14 provides an alternative technique for generating a high-resolution depth map in the absence of a stereo pair of images captured by stereo cameras.

FIG. 13 illustrates a conceptual representation of providing the low-resolution thermal image 1216 as input to upsampling 1302 to generate upsampled thermal image 1304. Upsampling 1302 may utilize any technique described herein or otherwise known in the art to generate a high-resolution image from an initial image input. In some instances, the upsampled thermal image 1304 is configured to have a same image resolution as the high-resolution thermal image 1208, as illustrated in FIG. 13. FIG. 13 also shows that parallax exists between the capture perspectives associated with the high-resolution thermal image 1208 and the upsampled thermal image 1304 (e.g., the representations of the object 1206 in the two images are vertically and horizontally offset from one another).

Because both the high-resolution thermal image 1208 and the upsampled thermal image 1304 have the same high image resolution and different associated capture perspectives, depth processing 1306 may be performed using the two images as input, as depicted in FIG. 13. Depth processing 1306 may utilize any technique described herein or otherwise known in the art to generate a depth map from image input. FIG. 13 illustrates the output of the depth processing 1306 as the high-resolution depth map 1308, which includes depth information 1310.

FIG. 13 also illustrates the depth map 1308 in the geometry of the high-resolution thermal image 1208, such that the depth information 1310 of the high-resolution depth map 1308 and the texture information 1210 of the high-resolution thermal image 1208 are spatially aligned. In view of their spatial alignment, a system may use the depth information 1310 to reproject the texture information 1210 to correspond to the perspective of a user's eye, as illustrated in FIG. 13 by the high-resolution depth map 1308 and the high-resolution thermal image 1208 being provided as inputs to reprojection 1312 (as indicated by arrows extending from the high-resolution depth map 1308 and the high-resolution thermal image 1208 to reprojection 1312). The reprojection 1312 may provide one or more parallax-corrected images 1314, such as a parallax-corrected thermal image that may be displayed to the user (e.g., using display 1108 of the HMD 1100).

The depth information 1310 may also be used to generate parallax-corrected views based on texture information captured by high-resolution cameras of other modalities, such as the high-resolution low light image 1212. For example, a system may generate reprojected low light texture information by using the depth information 1310 to reproject the texture information 1214 of the high-resolution low light image 1212 to become spatially aligned with the depth information 1310 of the high-resolution depth map 1308. A system may again reproject the already reprojected low light texture information to correspond to the perspective of a user's eye by using the depth information 1310, thereby forming a parallax-corrected low light image that may be displayed to a user (e.g., using display 1108 of the HMD 1100). Such operations are depicted in FIG. 13 by the arrow extending from the high-resolution low light image 1212 to reprojection 1312, which may contribute to the one or more parallax-corrected images 1314. As discussed above, the parallax-corrected thermal image and the parallax-corrected low light image may be combined to form a composite parallax-corrected image for presentation to a user.

FIG. 14 illustrates an alternative approach for generating a high-resolution depth map in the absence of a stereo pair of images captured by stereo cameras. FIG. 14 provides a conceptual representation of providing the high-resolution thermal image 1208 as input to downsampling 1402 to generate downsampled thermal image 1404.

In some implementations, downsampling 1402 includes reducing sections of pixels in an original image (e.g., high-resolution thermal image 1208) to a single pixel in the downsampled image (e.g., downsampled thermal image 1404). For example, in some instances, each pixel in the downsampled image is defined by a pixel of the original image:

$$p_d(m,n) = p(Km, Kn)$$

where $p_d$ is the pixel in the downsampled image, p is the pixel in the original image, K is a scaling factor, m is the pixel coordinate in the horizontal axis, and n is the pixel coordinate in the vertical axis. In some instances, the downsampling 1402 also includes prefiltering functions for defining the pixels of the downsampled image, such as anti-aliasing prefiltering to prevent aliasing artifacts.

In some implementations, downsampling 1402 utilizes an averaging filter for defining the pixels of the downsampled image based on the average of a section of pixels in the original image. In one example of downsampling by a factor of 2 along each axis, each pixel in the downsampled image is defined by an average of a 2×2 section of pixels in the original image:

$$p_d(m, n) = \frac{[p(2m, 2n) + p(2m, 2n+1) + p(2m+1, 2n) + p(2m+1, 2n+1)]}{4}$$

where $p_d$ is the pixel in the downsampled image, p is the pixel in the original image, m is the pixel coordinate in the horizontal axis, and n is the pixel coordinate in the vertical axis.

Downsampling 1402 may comprise iterative downsampling operations that are performed iteratively to arrive at a downsampled image of a desired final image resolution. FIG. 14 illustrates the downsampled thermal image 1404 as having a same image resolution as the low-resolution thermal image 1216, but with parallax between the capture perspectives associated with the downsampled thermal image 1404 and the low-resolution thermal image 1216. Accordingly, depth processing 1406 may be performed using the downsampled thermal image 1404 and the low-resolution thermal image 1216 as inputs. Depth processing 1406 may be more computationally efficient in view of the smaller image sizes of the downsampled thermal image 1404 and the low-resolution thermal image 1216 as compared to the high-resolution thermal image 1208 and the upsampled thermal image 1304 of FIG. 13.

FIG. 14 illustrates the output of depth processing 1406 as the depth map 1408, which has a lower image resolution than the high-resolution thermal image 1208. FIG. 14 also illustrates the depth map 1408 in the geometry of the downsampled thermal image 1404. FIG. 14 illustrates a conceptual representation of the depth map 1408 being provided as input to upsampling 1408 to generate upsampled depth map 1412, which includes upsampled depth information 1414. Upsampling 1408 may utilize any technique described herein or otherwise known in the art to generate a high-resolution image from an initial image input. For example, upsampling 1410 may utilize guidance based on high-resolution thermal image 1208 (although not explicitly shown in FIG. 14).

In some instances, the upsampled depth map 1412 is configured to have a same image resolution as the high-resolution thermal image 1208, as illustrated in FIG. 14. FIG. 13 also shows that the upsampled depth information 1414 of the upsampled depth map 1412 is spatially aligned with the texture information 1210 of the high-resolution thermal image 1208 (e.g., in view of the low-resolution depth map 1408 being in the geometry of the downsampled thermal image 1404, and/or in view of using the high-resolution thermal image 1208 as guidance for the upsampling 1410). Because of the same image resolutions and the spatial alignment between the upsampled depth map 1412 and the high-resolution thermal image 1208, a system may use the upsampled depth information 1414 to reproject the texture information 1210 to correspond to the perspective of a user's eye, as illustrated in FIG. 14 by the high-resolution thermal image 1208 and the upsampled depth map 1412 being provided as inputs to reprojection 1416 (as indicated by arrows extending from the high-resolution thermal image 1208 and the upsampled depth map 1412 to reprojection 1416). The reprojection 1416 may provide one or more parallax-corrected images 1418, such as a parallax-corrected thermal image that may be displayed to the user (e.g., using display 1108 of the HMD 1100).

The upsampled depth information 1414 may also be used to generate parallax-corrected views based on texture information captured by high-resolution cameras of other modalities, such as the high-resolution low light image 1212. For example, a system may generate reprojected low light texture information by using the upsampled depth information 1414 to reproject the texture information 1214 of the high-resolution low light image 1212 to become spatially aligned with the upsampled depth information 1414 of the upsampled depth map 1412. A system may again reproject the already reprojected low light texture information to correspond to the perspective of a user's eye by using the upsampled depth information 1414, thereby forming a parallax-corrected low light image that may be displayed to a user (e.g., using display 1108 of the HMD 1100). Such operations are depicted in FIG. 14 by the arrow extending from the high-resolution low light image 1212 to reprojection 1416, which may contribute to the one or more parallax-corrected images 1418. As discussed above, the parallax-corrected thermal image and the parallax-corrected low light image may be combined to form a composite parallax-corrected image for presentation to a user.

Example Method(s) for Dense Depth Computations Aided by Sparse Feature Matching

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 15:
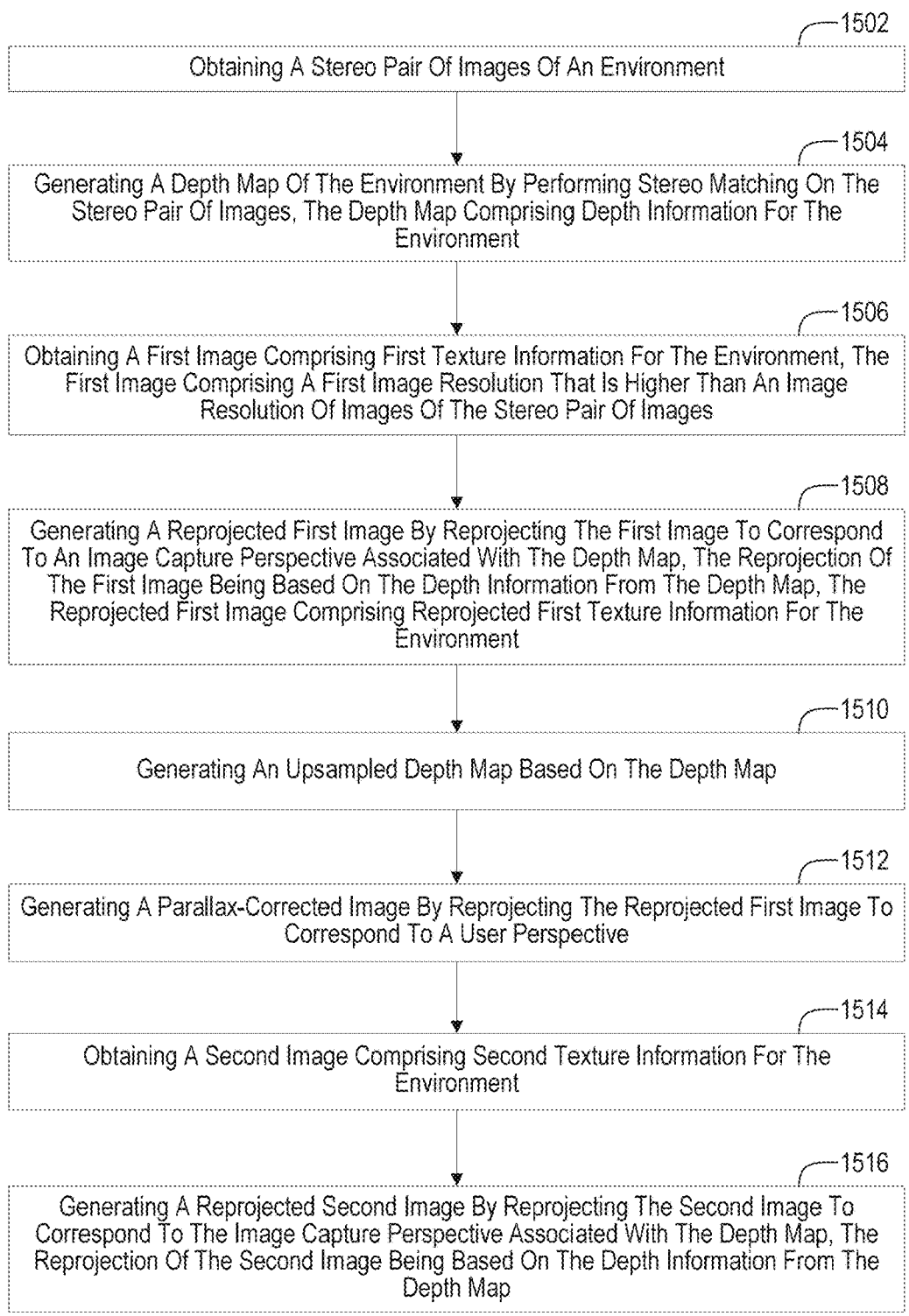
FIGS. 15-17 illustrate example flow diagrams depicting acts associated with low compute depth map generation to provide parallax-corrected images.
Figure 16:
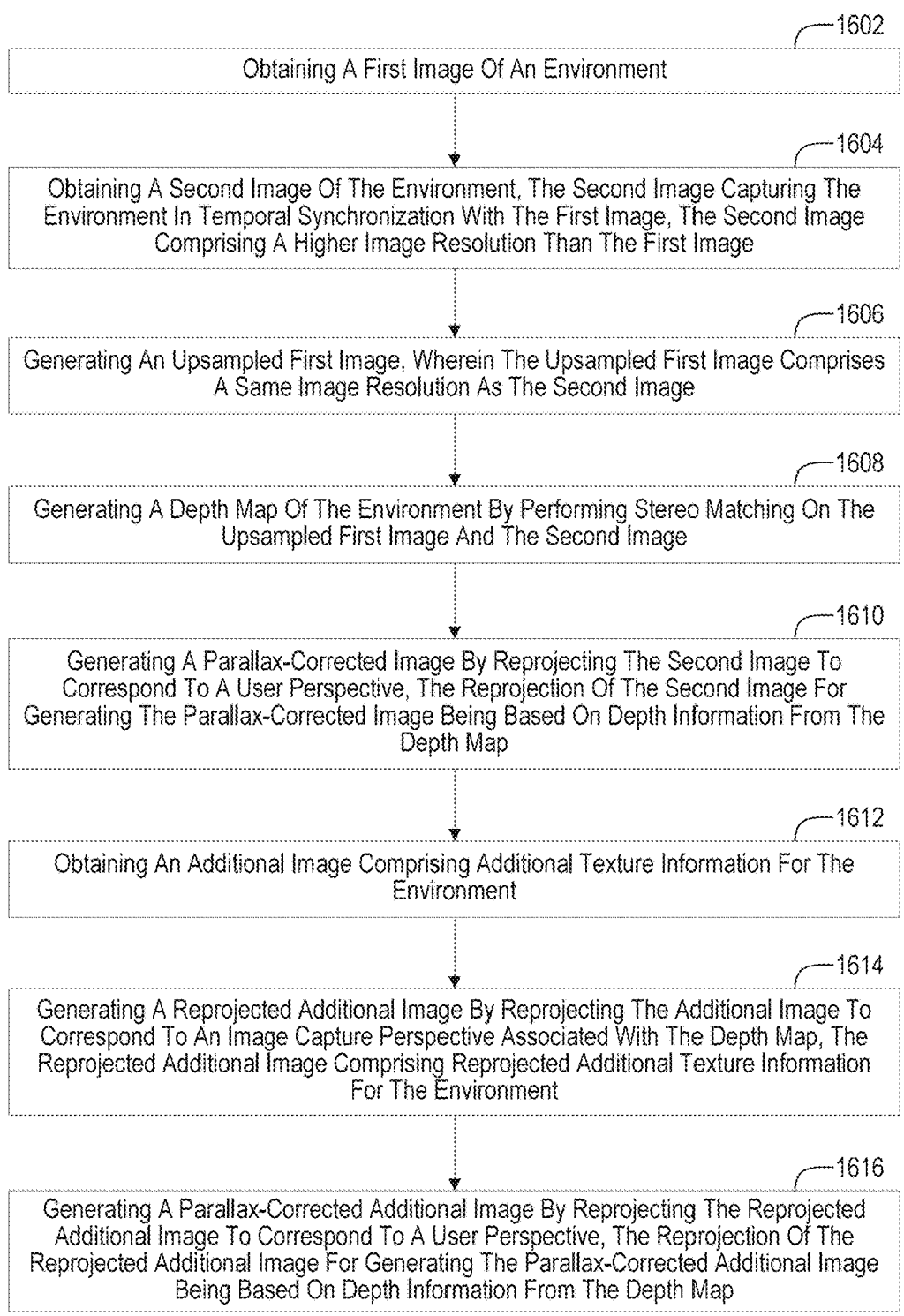
Figure 17:
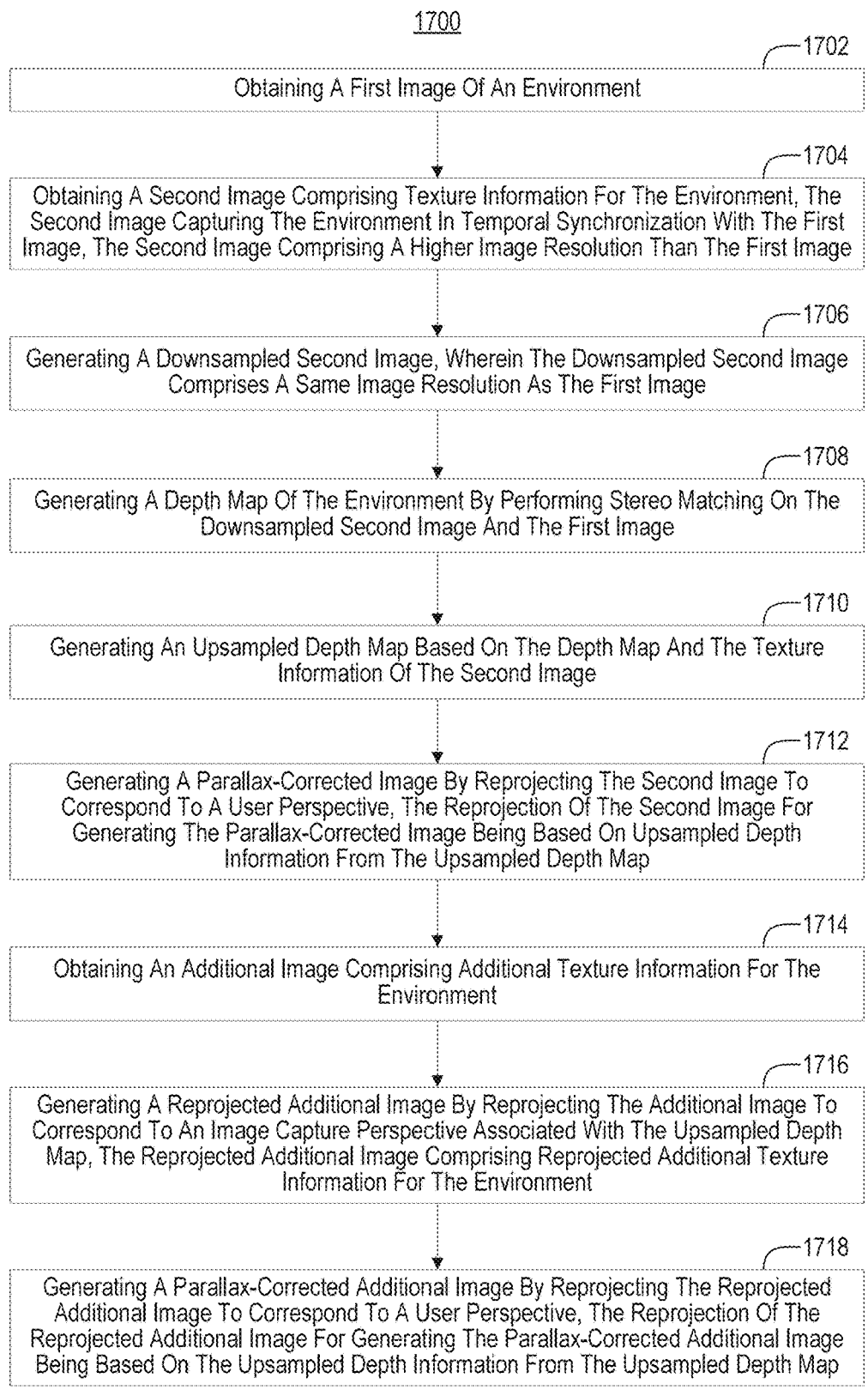

FIGS. 15-17 illustrate example flow diagrams 1500, 1600, and 1700, respectively, depicting acts associated with low compute depth map generation to provide parallax-corrected images. The discussion of the various acts represented in the flow diagrams include references to various hardware components described in more detail with reference to FIGS. 2, 4, and 11.

Act 1502 of flow diagram 1500 of FIG. 15 includes obtaining a stereo pair of images of an environment. Act 1502 is performed, in some implementations, utilizing one or more components of a system 200, such as processor(s) 202, storage 204, sensor(s) 210, I/O system(s) 212, communication system(s) 214, and/or others. In some instances, the system 200 comprises a head-mounted display (HMD), and the system 200 may include a stereo camera pair that captures the stereo pair of images of the environment.

Act 1504 of flow diagram 1500 includes generating a depth map of the environment by performing stereo matching on the stereo pair of images, the depth map comprising depth information for the environment. Act 1504 is performed, in some implementations, utilizing one or more components of a system 200, such as processor(s) 202, storage 204, sensor(s) 210, I/O system(s) 212, communication system(s) 214, and/or others.

Act 1506 of flow diagram 1500 includes obtaining a first image comprising first texture information for the environment, the first image comprising a first image resolution that is higher than an image resolution of images of the stereo pair of images. Act 1506 is performed, in some implementations, utilizing one or more components of a system 200, such as processor(s) 202, storage 204, sensor(s) 210, I/O system(s) 212, communication system(s) 214, and/or others. In some implementations, the system 200 includes a first camera that captures the first image. The first camera may be of a different modality than the stereo camera pair that captures the stereo pair of images. For example, the first camera may be a low light camera, whereas the cameras of the stereo camera pair may be thermal cameras. In another example, the first camera is a thermal camera, and the cameras of the stereo camera pair are low light cameras.

In some instances, first camera may be of the same modality as the stereo camera pair that captures the stereo pair of images. For example, the first camera and the cameras of the stereo pair of cameras may be thermal cameras, or the first camera and the cameras of the stereo pair of cameras may be low light cameras.

Act 1508 of flow diagram 1500 includes generating a reprojected first image by reprojecting the first image to correspond to an image capture perspective associated with the depth map, the reprojection of the first image being based on the depth information from the depth map, the reprojected first image comprising reprojected first texture information for the environment. Act 1508 is performed, in some implementations, utilizing one or more components of a system 200, such as processor(s) 202, storage 204, sensor(s) 210, I/O system(s) 212, communication system(s) 214, and/or others.

Act 1510 of flow diagram 1500 includes generating an upsampled depth map based on the depth map. Act 1510 is performed, in some implementations, utilizing one or more components of a system 200, such as processor(s) 202, storage 204, sensor(s) 210, I/O system(s) 212, communication system(s) 214, and/or others. In some instances, the upsampled depth map and the reprojected first image comprise a same image resolution. In some instances, the generating of the upsampled depth map is based on the reprojected first texture information. Furthermore, in some instances, generating the upsampled depth map includes utilizing an edge-preserving filter, such as a joint bilateral filter.

Act 1512 of flow diagram 1500 includes generating a parallax-corrected image by reprojecting the reprojected first image to correspond to a user perspective. Act 1512 is performed, in some implementations, utilizing one or more components of a system 200, such as processor(s) 202, storage 204, sensor(s) 210, I/O system(s) 212, communication system(s) 214, and/or others. The reprojection of the reprojected first image for generating the parallax-corrected image is based on upsampled depth information from the upsampled depth map. The parallax-corrected image may be displayed on a display of the system 200 (e.g., display 408).

Act 1514 of flow diagram 1500 includes obtaining a second image comprising second texture information for the environment. Act 1514 is performed, in some implementations, utilizing one or more components of a system 200, such as processor(s) 202, storage 204, sensor(s) 210, I/O system(s) 212, communication system(s) 214, and/or others. The second image has a second image resolution that is higher than the image resolution of the images of the stereo pair of images. In some instances, the second image is associated with a different camera modality than the first image. For example, the system 200 may include a second camera that captures the second image, and the second camera may be of a different modality than the first camera and the stereo camera pair (e.g., the second camera may be a low light camera while the other cameras are not low light cameras, or the second camera may be a thermal camera while the other cameras are not thermal cameras).

Act 1516 of flow diagram 1500 includes generating a reprojected second image by reprojecting the second image to correspond to the image capture perspective associated with the depth map, the reprojection of the second image being based on the depth information from the depth map. Act 1516 is performed, in some implementations, utilizing one or more components of a system 200, such as processor(s) 202, storage 204, sensor(s) 210, I/O system(s) 212, communication system(s) 214, and/or others. The reprojected second image may include reprojected second texture information for the environment;

Act 1602 of flow diagram 1600 of FIG. 16 includes obtaining a first image of an environment. Act 1602 is performed, in some implementations, utilizing one or more components of a system 200, such as processor(s) 202, storage 204, sensor(s) 210, I/O system(s) 212, communication system(s) 214, and/or others.

Act 1604 of flow diagram 1600 includes obtaining a second image of the environment, the second image capturing the environment in temporal synchronization with the first image, the second image comprising a higher image resolution than the first image. Act 1604 is performed, in some implementations, utilizing one or more components of a system 200, such as processor(s) 202, storage 204, sensor(s) 210, I/O system(s) 212, communication system(s) 214, and/or others.

Act 1606 of flow diagram 1600 includes generating an upsampled first image, wherein the upsampled first image comprises a same image resolution as the second image. Act 1606 is performed, in some implementations, utilizing one or more components of a system 200, such as processor(s) 202, storage 204, sensor(s) 210, I/O system(s) 212, communication system(s) 214, and/or others.

Act 1608 of flow diagram 1600 includes generating a depth map of the environment by performing stereo matching on the upsampled first image and the second image. Act 1608 is performed, in some implementations, utilizing one or more components of a system 200, such as processor(s) 202, storage 204, sensor(s) 210, I/O system(s) 212, communication system(s) 214, and/or others.

Act 1610 of flow diagram 1600 includes generating a parallax-corrected image by reprojecting the second image to correspond to a user perspective, the reprojection of the second image for generating the parallax-corrected image being based on depth information from the depth map. Act 1610 is performed, in some implementations, utilizing one or more components of a system 200, such as processor(s) 202, storage 204, sensor(s) 210, I/O system(s) 212, communication system(s) 214, and/or others.

Act 1612 of flow diagram 1600 includes obtaining an additional image comprising additional texture information for the environment. Act 1612 is performed, in some implementations, utilizing one or more components of a system 200, such as processor(s) 202, storage 204, sensor(s) 210, I/O system(s) 212, communication system(s) 214, and/or others. The additional image includes a higher image resolution than the first image. The additional image may be associated with a different camera modality than the second image discussed above with reference to act 1604.

Act 1614 of flow diagram 1600 includes generating a reprojected additional image by reprojecting the additional image to correspond to an image capture perspective associated with the depth map, the reprojected additional image comprising reprojected additional texture information for the environment. Act 1614 is performed, in some implementations, utilizing one or more components of a system 200, such as processor(s) 202, storage 204, sensor(s) 210, I/O system(s) 212, communication system(s) 214, and/or others.

Act 1616 of flow diagram 1600 includes generating a parallax-corrected additional image by reprojecting the reprojected additional image to correspond to a user perspective, the reprojection of the reprojected additional image for generating the parallax-corrected additional image being based on depth information from the depth map. Act 1616 is performed, in some implementations, utilizing one or more components of a system 200, such as processor(s) 202, storage 204, sensor(s) 210, I/O system(s) 212, communication system(s) 214, and/or others.

Act 1702 of flow diagram 1700 of FIG. 17 includes obtaining a first image of an environment. Act 1702 is performed, in some implementations, utilizing one or more components of a system 200, such as processor(s) 202, storage 204, sensor(s) 210, I/O system(s) 212, communication system(s) 214, and/or others.

Act 1704 of flow diagram 1700 includes obtaining a second image comprising texture information for the environment, the second image capturing the environment in temporal synchronization with the first image, the second image comprising a higher image resolution than the first image. Act 1704 is performed, in some implementations, utilizing one or more components of a system 200, such as processor(s) 202, storage 204, sensor(s) 210, I/O system(s) 212, communication system(s) 214, and/or others. In some instances, the first image and the second image are associated with a same camera modality.

Act 1706 of flow diagram 1700 includes generating a downsampled second image, wherein the downsampled second image comprises a same image resolution as the first image. Act 1706 is performed, in some implementations, utilizing one or more components of a system 200, such as processor(s) 202, storage 204, sensor(s) 210, I/O system(s) 212, communication system(s) 214, and/or others.

Act 1708 of flow diagram 1700 includes generating a depth map of the environment by performing stereo matching on the downsampled second image and the first image. Act 1708 is performed, in some implementations, utilizing one or more components of a system 200, such as processor(s) 202, storage 204, sensor(s) 210, I/O system(s) 212, communication system(s) 214, and/or others.

Act 1710 of flow diagram 1700 includes generating an upsampled depth map based on the depth map and the texture information of the second image. Act 1710 is performed, in some implementations, utilizing one or more components of a system 200, such as processor(s) 202, storage 204, sensor(s) 210, I/O system(s) 212, communication system(s) 214, and/or others.

Act 1712 of flow diagram 1700 includes generating a parallax-corrected image by reprojecting the second image to correspond to a user perspective, the reprojection of the second image for generating the parallax-corrected image being based on upsampled depth information from the upsampled depth map. Act 1712 is performed, in some implementations, utilizing one or more components of a system 200, such as processor(s) 202, storage 204, sensor(s) 210, I/O system(s) 212, communication system(s) 214, and/or others.

Act 1714 of flow diagram 1700 includes obtaining an additional image comprising additional texture information for the environment. Act 1714 is performed, in some implementations, utilizing one or more components of a system 200, such as processor(s) 202, storage 204, sensor(s) 210, I/O system(s) 212, communication system(s) 214, and/or others. The additional image includes a higher image resolution than the first image. The additional image may be associated with a different camera modality than the first image and the second image.

Act 1716 of flow diagram 1700 includes generating a reprojected additional image by reprojecting the additional image to correspond to an image capture perspective associated with the upsampled depth map, the reprojected additional image comprising reprojected additional texture information for the environment. Act 1716 is performed, in some implementations, utilizing one or more components of a system 200, such as processor(s) 202, storage 204, sensor(s) 210, I/O system(s) 212, communication system(s) 214, and/or others.

Act 1718 of flow diagram 1700 includes generating a parallax-corrected additional image by reprojecting the reprojected additional image to correspond to a user perspective, the reprojection of the reprojected additional image for generating the parallax-corrected additional image being based on the upsampled depth information from the upsampled depth map. Act 1718 is performed, in some implementations, utilizing one or more components of a system 200, such as processor(s) 202, storage 204, sensor(s) 210, I/O system(s) 212, communication system(s) 214, and/or others.

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are one or more "physical computer storage media" or "hardware storage device(s)." Computer-readable media that merely carry computer-executable instructions without storing the computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in hardware in the form of computer-executable instructions, data, or data structures and that can be accessed by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry program code in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Disclosed embodiments may comprise or utilize cloud computing. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, wearable devices, and the like. The invention may also be practiced in distributed system environments where multiple computer systems (e.g., local and remote systems), which are linked through a network (either by hardwired data links, wireless data links, or by a combination of hardwired and wireless data links), perform tasks. In a distributed system environment, program modules may be located in local and/or remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Application-specific Standard Products (ASSPs), System-on-a-chip systems (SOCs), Complex Programmable Logic Devices (CPLDs), central processing units (CPUs), graphics processing units (GPUs), and/or others.

As used herein, the terms "executable module," "executable component," "component," "module," or "engine" can refer to hardware processing units or to software objects, routines, or methods that may be executed on one or more computer systems. The different components, modules, engines, and services described herein may be implemented as objects or processors that execute on one or more computer systems (e.g., as separate threads).

One will also appreciate how any feature or operation disclosed herein may be combined with any one or combination of the other features and operations disclosed herein. Additionally, the content or feature in any one of the figures may be combined or used in connection with any content or feature used in any of the other figures. In this regard, the content disclosed in any one figure is not mutually exclusive and instead may be combinable with the content from any of the other figures.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A system for facilitating low compute depth map generation to provide parallax-corrected images, the system comprising:
   one or more processors; and
   one or more hardware storage devices storing instructions that are executable by the one or more processors to configure the system to facilitate low compute depth map generation to provide parallax-corrected images by configuring the system to:
   obtain a stereo pair of images of an environment;
   generate a depth map of the environment by performing stereo matching on the stereo pair of images, the depth map comprising depth information for the environment;
   obtain a first image comprising first texture information for the environment, the first image comprising a first image resolution that is higher than an image resolution of images of the stereo pair of images, wherein parallax exists between an image capture perspective associated with the depth map and an image capture perspective associated with the first image, and wherein the stereo pair of images and the first image are captured at a same time of capture;
   generate a reprojected first image by reprojecting the first image to cause the image capture perspective associated with the first image to correspond to the image capture perspective associated with the depth map, the reprojection of the first image being based on the depth information from the depth map, the reprojected first image comprising reprojected first texture information for the environment; and
   generate an upsampled depth map based on the depth map using the reprojected first image.

2. The system of claim 1, wherein the upsampled depth map and the reprojected first image comprise a same image resolution, and wherein the generating of the upsampled depth map is based on the reprojected first texture information.

3. The system of claim 1, wherein generating the upsampled depth map comprises utilizing an edge-preserving filter.

4. The system of claim 3, wherein the edge-preserving filter comprises a joint bilateral filter.

5. The system of claim 1, wherein the instructions are executable by the one or more processors to further configure the system to generate a parallax-corrected image by reprojecting the reprojected first image to correspond to a user perspective, the reprojection of the reprojected first image for generating the parallax-corrected image being based on upsampled depth information from the upsampled depth map.

6. The system of claim 5, wherein the system further comprises a display, and wherein the instructions are executable by the one or more processors to further configure the system to display the parallax-corrected image on the display.

7. The system of claim 1, wherein the system comprises a stereo camera pair and a first camera.

8. The system of claim 7, wherein the stereo pair of images is captured by the stereo camera pair, and wherein the first image is captured by the first camera.

9. The system of claim 7, wherein the first camera is of a different modality than the stereo camera pair.

10. The system of claim 9, wherein the first camera is a low light camera, and wherein cameras of the stereo camera pair are thermal cameras.

11. The system of claim 7, wherein the stereo camera pair and the first camera are of a same camera modality.

12. The system of claim 11, wherein the stereo camera pair and the first camera are thermal cameras.

13. The system of claim 11, wherein the instructions are executable by the one or more processors to further configure the system to:
   obtain a second image comprising second texture information for the environment, the second image comprising a second image resolution that is higher than the image resolution of the images of the stereo pair of images, wherein the second image is associated with a different camera modality than the first image; and
   generate a reprojected second image by reprojecting the second image to correspond to the image capture perspective associated with the depth map, the reprojection of the second image being based on the depth information from the depth map, the reprojected second image comprising reprojected second texture information for the environment.

14. The system of claim 13, wherein the system comprises a second camera that captures the second image, the second camera being of a different modality than the first camera and the stereo camera pair.

15. The system of claim 1, wherein the system comprises a head-mounted display (HMD).

* * * * *